US011471937B2

(12) United States Patent
Oomori et al.

(10) Patent No.: US 11,471,937 B2
(45) Date of Patent: Oct. 18, 2022

(54) METHOD FOR MANUFACTURING CYLINDER HEAD, AND SEMIMANUFACTURED CYLINDER HEAD

(71) Applicant: NISSAN MOTOR CO., LTD., Yokohama (JP)

(72) Inventors: Masahiro Oomori, Kanagawa (JP); Hirohisa Shibayama, Kanagawa (JP); Kenji Yageta, Kanagawa (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 140 days.

(21) Appl. No.: 17/253,933

(22) PCT Filed: Jun. 28, 2018

(86) PCT No.: PCT/JP2018/024687

§ 371 (c)(1),
(2) Date: Dec. 18, 2020

(87) PCT Pub. No.: WO2020/003462

PCT Pub. Date: Jan. 2, 2020

(65) Prior Publication Data

US 2021/0268576 A1 Sep. 2, 2021

(51) Int. Cl.

| | |
|---|---|
| ***B23P 11/00*** | (2006.01) |
| ***B22D 15/02*** | (2006.01) |
| ***B22D 29/00*** | (2006.01) |
| ***F01L 3/04*** | (2006.01) |
| ***F02F 1/24*** | (2006.01) |
| *C23C 24/04* | (2006.01) |

(52) U.S. Cl.

CPC ........... *B22D 15/02* (2013.01); *B22D 29/001* (2013.01); *F01L 3/04* (2013.01); *F02F 1/24* (2013.01); *C23C 24/04* (2013.01); *F02F 2200/06* (2013.01)

(58) Field of Classification Search

CPC .... F01L 3/04; C23C 24/00; F02F 1/24; Y10T 29/49306; F16K 1/42

USPC ...................................................... 29/888.06

See application file for complete search history.

(56) References Cited

U.S. PATENT DOCUMENTS 5,745,993 A * 5/1998 Adachi ..................... F01L 3/22 29/888.44
11,060,425 B2 * 7/2021 Hattiangadi .............. F01L 3/06
2009/0255504 A1 10/2009 Ogino et al.
(Continued)

FOREIGN PATENT DOCUMENTS

CN 101484611 A 7/2009
CN 107849699 A 3/2018
JP 5-256190 A 10/1993
(Continued)

*Primary Examiner* — Long T Tran
*Assistant Examiner* — James J Kim
(74) *Attorney, Agent, or Firm* — Foley & Lardner LLP

(57) ABSTRACT

The disclosure includes manufacturing a semimanufactured cylinder head (3) having a shielding curtain portion (16*g*) and spraying metal powder (P) onto an annular valve seat portion (16*f*) using a cold spray method to form a valve seat film (16*b*). The shielding curtain portion (16*g*) projects in an annular shape from an annular edge portion of an opening portion (16*a*) of an intake port (16) or an opening portion (17*a*) of an exhaust port (17) toward the center (C) of the port. The annular valve seat portion (16*f*) is located on an outer side of the port than the shielding curtain portion (16*g*).

6 Claims, 21 Drawing Sheets

(56) References Cited

U.S. PATENT DOCUMENTS

| | | | | |
|---|---|---|---|---|
| 2018/0223902 | A1* | 8/2018 | Izawa | F01L 3/02 |
| 2022/0082035 | A1* | 3/2022 | Wang | B22F 7/06 |

FOREIGN PATENT DOCUMENTS

| | | | |
|---|---|---|---|
| JP | 7-284970 | A | 10/1995 |
| JP | 8-224683 | A | 9/1996 |
| JP | 2005-299549 | A | 10/2005 |
| JP | 2010-223013 | A | 10/2010 |
| JP | 2014-156790 | A | 8/2014 |
| JP | 2015-137367 | A | 7/2015 |
| JP | 2016-200042 | A | 12/2016 |
| WO | WO 2017/022505 | A1 | 2/2017 |

* cited by examiner

METHOD FOR MANUFACTURING CYLINDER HEAD, AND SEMIMANUFACTURED CYLINDER HEAD

TECHNICAL FIELD

The present invention relates to a method for manufacturing a cylinder head of an internal-combustion engine and relates also to a semimanufactured cylinder head used for manufacturing a cylinder head.

BACKGROUND ART

A sliding member and a method for manufacturing the sliding member are known (Patent Document 1). The sliding member includes a film layer formed on a base material. The film layer is composed of a particle aggregate of a precipitation-hardened copper alloy. The method for manufacturing the sliding member includes spraying metal powder of the precipitation-hardened copper alloy onto the base material using a cold spray method to form the previously described film layer.

The invention of Patent Document 1 also proposes an approach to using the sliding member in an internal-combustion engine. In this approach, the valve seat for an engine valve is formed by spraying metal powder of the precipitation-hardened copper alloy onto an engine valve seating portion of a cylinder head using a cold spray method to provide the previously described film layer.

PRIOR ART DOCUMENT

Patent Document

[Patent Document 1] WO2017/022505

SUMMARY OF INVENTION

Problems to be Solved by Invention

Unfortunately, however, when the metal powder is sprayed onto the seating portion of the cylinder head using a cold spray method, the metal powder may be scattered also around the seating portion to form an unnecessary excess film. If such an excess film is formed in an intake or exhaust port of the cylinder head, a problem may arise in that the size of the port varies and the fuel efficiency and output performance of the engine deteriorate.

A problem to be solved by the present invention is to provide a method for manufacturing a cylinder head and a semimanufactured cylinder head with which a valve seat film can be formed using a cold spray method while suppressing the formation of an excess film in a port.

Means for Solving Problems

The present invention solves the above problem through manufacturing a semimanufactured cylinder head having a shielding curtain portion and spraying metal powder onto an annular valve seat portion using a cold spray method to form a valve seat film. The shielding curtain portion projects in an annular shape from an annular edge portion of an opening portion of a port for intake or exhaust toward the center of the port. The annular valve seat portion is located on an outer side of the port than the shielding curtain portion. The shielding curtain portion has a surface on a side of the at least one of the opening portions, the surface is arranged on an inner side of the port than a surface of the annular valve seat portion so as not to be same as the surface of the annular valve seat portion.

Effect of Invention

According to the present invention, the shielding curtain portion partially shields the inside of the port, and the valve seat film can therefore be formed using a cold spray method while suppressing the formation of an excess film in the port.

MODE(S) FOR CARRYING OUT THE INVENTION

Figure 1:
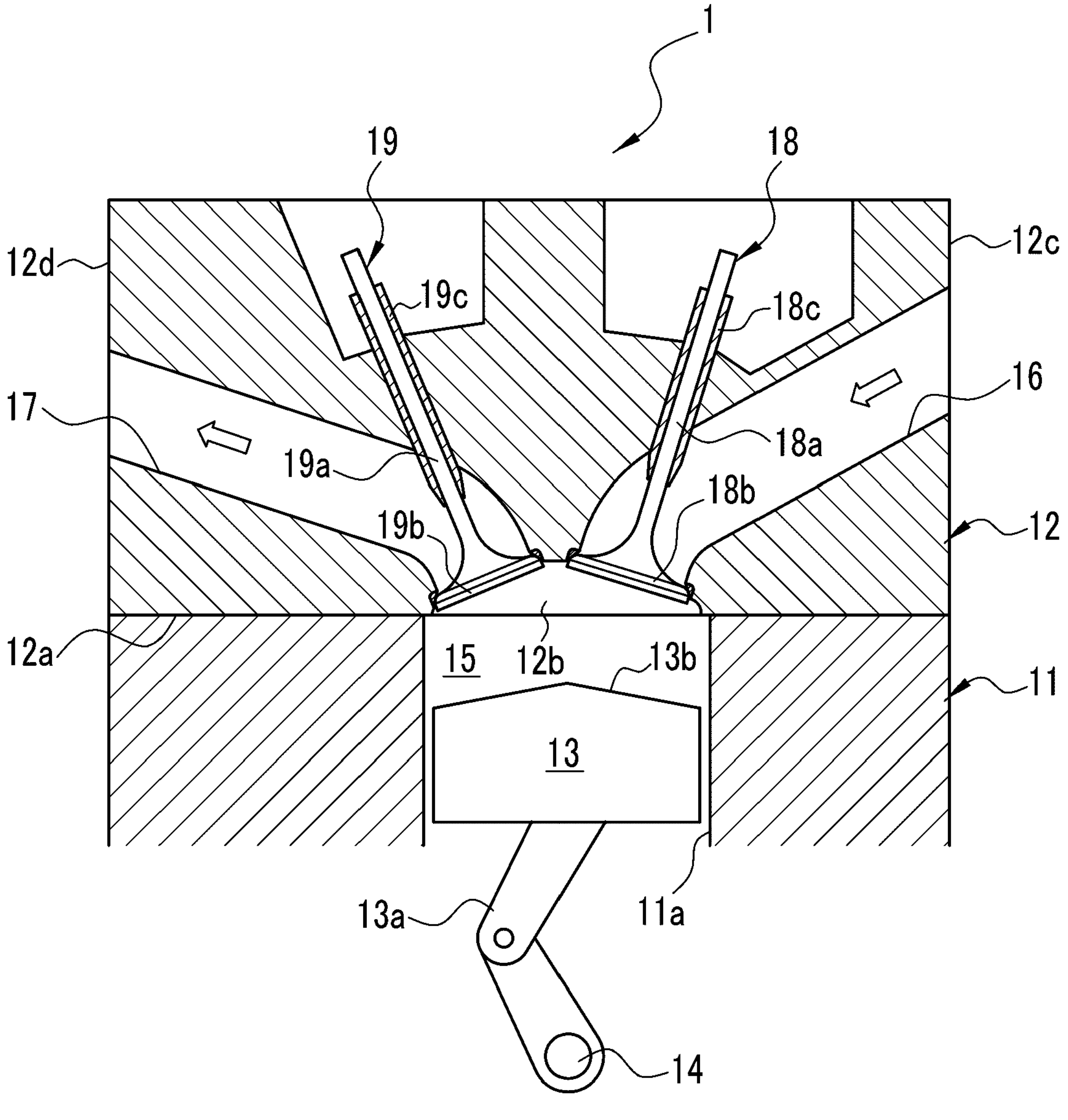
FIG. 1 is a cross-sectional view illustrating the configuration of an internal-combustion engine including a cylinder head that is manufactured by the manufacturing method according to one or more embodiments of the present invention using a semimanufactured cylinder head according to one or more embodiments of the present invention.

Hereinafter, one or more embodiments of the present invention will be described with reference to the drawings. First, an internal-combustion engine 1 including a cylinder head manufactured by the manufacturing method according to one or more embodiments of the present invention will be described. The cylinder head is manufactured using a semi-manufactured cylinder head according to one or more embodiments of the present invention. FIG. 1 is a cross-sectional view of the internal-combustion engine 1 and mainly illustrates the configuration around the cylinder head.

The internal-combustion engine 1 includes a cylinder block 11 and a cylinder head 12 that is mounted on the upper portion of the cylinder block 11. The internal-combustion engine 1 is, for example, a four-cylinder gasoline engine, and the cylinder block 11 has four cylinders 11*a* arranged in the depth direction of the drawing sheet. The cylinders 11*a* house respective pistons 13 that reciprocate in the vertical direction in the figure. Each piston 13 is connected to a crankshaft 14, which extends in the depth direction of the drawing sheet, via a connecting rod 13*a*.

The cylinder head 12 has a mounting surface 12*a* for being mounted to the cylinder block 11. The mounting surface 12*a* is provided with four recesses 12*b* at positions corresponding to respective cylinders 11*a*. The recesses 12*b* define combustion chambers 15 of the cylinders. Each combustion chamber 15 is a space for combusting a mixture gas of fuel and intake air and is defined by a recess 12*b* of the cylinder head 12, a top surface 13*b* of the piston 13, and an inner circumferential surface of the cylinder 11*a*.

The cylinder head 12 includes ports for intake (referred to as intake ports, hereinafter) 16 that connect between the combustion chambers 15 and one side surface 12*c* of the cylinder head 12. The intake ports 16 have a curved, approximately cylindrical shape and supply intake air from an intake manifold (not illustrated) connected to the side surface 12*c* into respective combustion chambers 15.

The cylinder head 12 further includes ports for exhaust (referred to as exhaust ports, hereinafter) 17 that connect between the combustion chambers 15 and the other side surface 12*d* of the cylinder head 12. The exhaust ports 17 have a curved, approximately cylindrical shape like the intake ports 16 and exhaust the exhaust gas generated by the combustion of the mixture gas in respective combustion chambers 15 to an exhaust manifold (not illustrated) connected to the side surface 12*d*. In the internal-combustion engine 1 according to one or more embodiments of the present invention, one cylinder 11*a* is provided with two intake ports 16 and two exhaust ports 17.

The cylinder head 12 is provided with intake valves 18 that open and close the intake ports 16 with respect to the combustion chambers 15 and exhaust valves 19 that open and close the exhaust ports 17 with respect to the combustion chambers 15. Each intake valve 18 includes a round rod-shaped valve stem 18*a* and an approximately disk-shaped valve head 18*b* that is provided at the tip of the valve stem 18*a*. Likewise, each exhaust valve 19 includes a round rod-shaped valve stem 19*a* and an approximately disk-shaped valve head 19*b* that is provided at the tip of the valve stem 19*a*. The valve stems 18*a* and 19*a* are slidably inserted into approximately cylindrical valve guides 18*c* and 19*c*, respectively. This allows the intake valves 18 and the exhaust valves 19 to be movable with respect to the combustion chambers 15 along the axial directions of the valve stems 18*a* and 19*a*.

Figure 2:
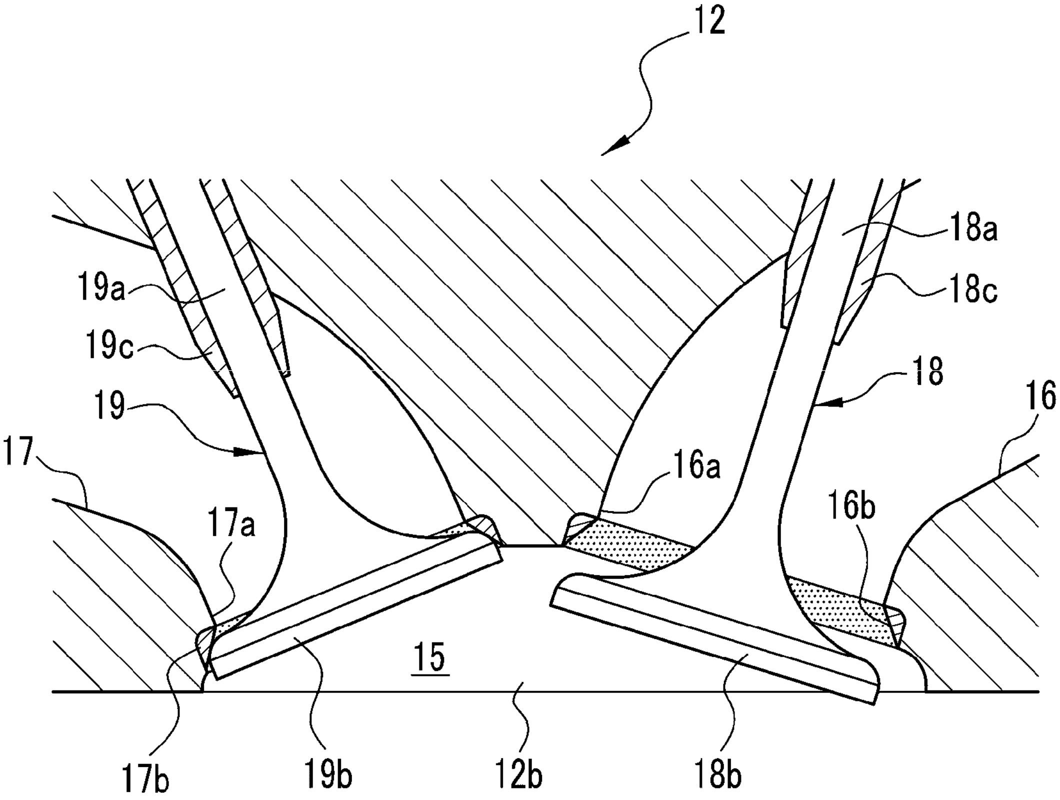
FIG. 2 is a cross-sectional view illustrating the configuration around valves of the internal-combustion engine including the cylinder head that is manufactured by the manufacturing method according to one or more embodiments of the present invention using the semimanufactured cylinder head according to one or more embodiments of the present invention.

FIG. 2 is an enlarged view illustrating a portion in which a combustion chamber 15 communicates with an intake port 16 and an exhaust port 17. The intake port 16 includes an approximately circular opening portion 16*a* at the portion communicating with the combustion chamber 15. The opening portion 16*a* has an annular edge portion provided with an annular valve seat film 16*b* that abuts against the valve head 18*b* of an intake valve 18. When the intake valve 18 moves upward along the axial direction of the valve stem 18*a*, the upper surface of the valve head 18*b* comes into contact with the valve seat film 16*b* to close the intake port 16. When the intake valve 18 moves downward along the axial direction of the valve stem 18*a*, a gap is formed between the upper surface of the valve head 18*b* and the valve seat film 16*b* to open the intake port 16.

Like the intake port 16, the exhaust port 17 includes an approximately circular opening portion 17*a* at the portion communicating with the combustion chamber 15, and the opening portion 17*a* has an annular edge portion provided with an annular valve seat film 17*b* that abuts against the valve head 19*b* of an exhaust valve 19. When the exhaust valve 19 moves upward along the axial direction of the valve stem 19*a*, the upper surface of the valve head 19*b* comes into contact with the valve seat film 17*b* to close the exhaust port 17. When the exhaust valve 19 moves downward along the axial direction of the valve stem 19*a*, a gap is formed between the upper surface of the valve head 19*b* and the valve seat film 17*b* to open the exhaust port 17.

In the four-cycle internal-combustion engine 1, for example, only the intake valve 18 opens when the corresponding piston 13 moves down, and the mixture gas is introduced from the intake port 16 into the cylinder 11*a*. Subsequently, in a state in which the intake valve 18 and the exhaust valve 19 are closed, the piston 13 moves up to compress the mixture gas in the cylinder 11*a*, and when the piston 13 approximately reaches the top dead center, the mixture gas is ignited to explode by a spark plug, which is not illustrated. This explosion makes the piston 13 move down to the bottom dead center and is converted into the rotational force via the connected crankshaft 14. When the piston 13 reaches the bottom dead center and starts moving up again, only the exhaust valve 19 is opened to exhaust the exhaust gas in the cylinder 11*a* to the exhaust port 17. The internal-combustion engine 1 repeats the above cycle to generate the output.

The opening portions 16*a* and 17*a* of the cylinder head 12 have respective annular edge portions, and the valve seat films 16*b* and 17*b* are formed directly on the annular edge portions using a cold spray method. The cold spray method refers to a method that includes making a supersonic flow of an operation gas having a temperature lower than the melting point or softening point of a metal powder, injecting the metal powder carried by a carrier gas into the operation gas to spray the metal powder from a nozzle tip, and causing the metal powder in the solid phase state to collide with a base material to form a metal film by plastic deformation of the metal powder. Compared with a thermal spray method in which the material is melted and deposited on a base material, the cold spray method has features that a dense film can be obtained without oxidation in the air, thermal alteration is suppressed because of less thermal effect on the material particles, the film formation speed is high, the film can be made thick, and the deposition efficiency is high. In particular, the cold spray method is suitable for use for structural materials such as the valve seat films 16*b* and 17*b* of the internal-combustion engine 1 because the film formation speed is high and the films can be made thick.

Figure 3:
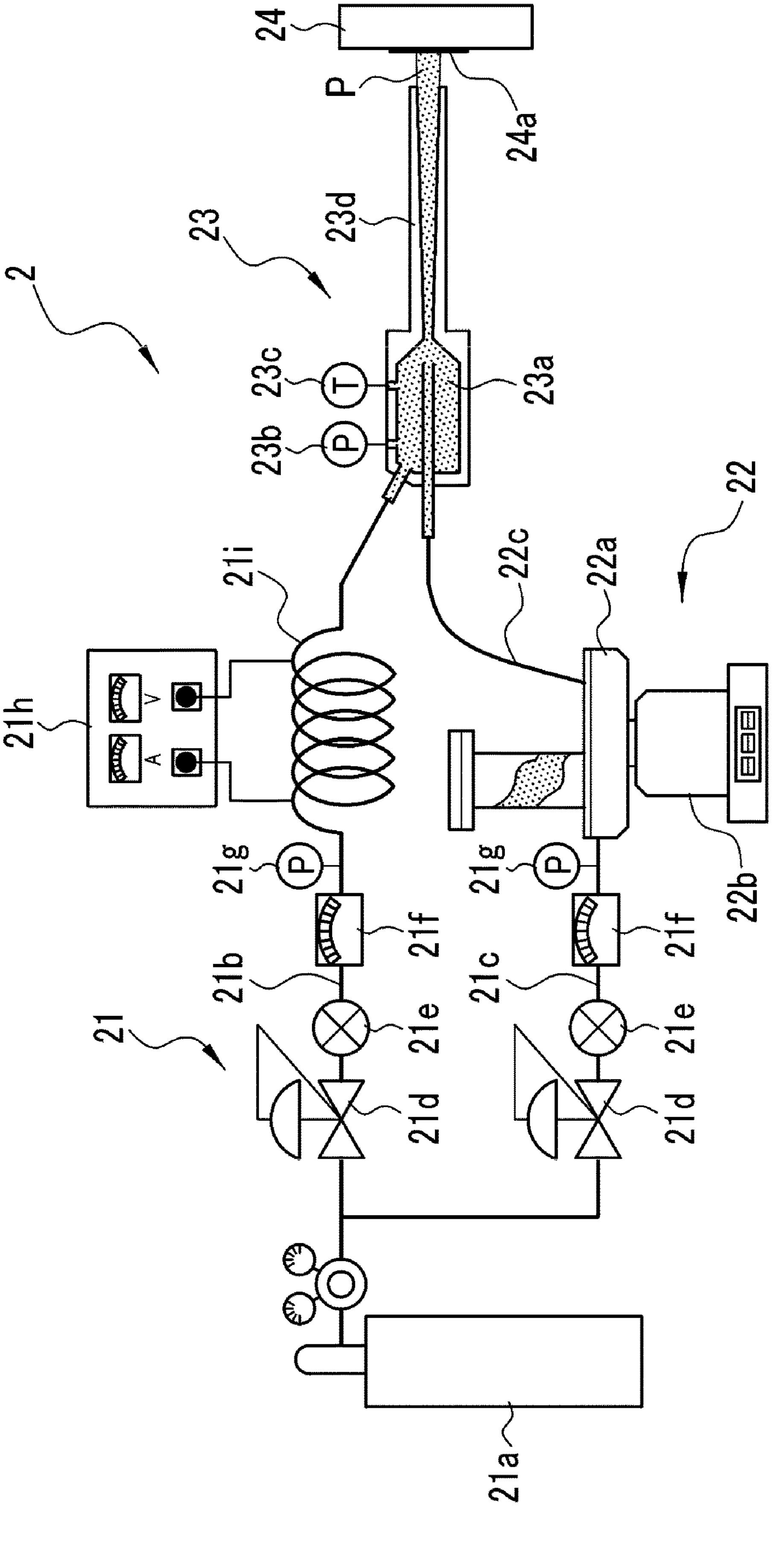
FIG. 3 is a schematic view illustrating the configuration of a cold spray apparatus used in the method for manufacturing a cylinder head according to one or more embodiments of the present invention.

FIG. 3 illustrates the schematic configuration of a cold spray apparatus used in the cold spray method. The cold spray apparatus 2 includes a gas supply unit 21 that supplies an operation gas and a carrier gas, a metal powder supply unit 22 that supplies a metal powder, and a cold spray gun 23 that sprays the metal powder as a supersonic flow using the operation gas having a temperature equal to or lower than the melting point of the metal powder.

The gas supply unit 21 includes a compressed gas cylinder 21*a*, an operation gas line 21*b*, and a carrier gas line 21*c*. Each of the operation gas line 21*b* and the carrier gas line 21*c* includes a pressure regulator 21*d*, a flow rate control valve 21*e*, a flow meter 21*f*, and a pressure gauge 21*g*. The pressure regulators 21*d*, the flow rate control valves 21*e*, the flow meters 21*f*, and the pressure gauges 21*g* are used for adjusting the pressure and flow rate of the operation gas and carrier gas from the compressed gas cylinder 21*a*.

The operation gas line 21*b* is installed with a heater 21*i* heated by a power source 21*h*. The operation gas is heated by the heater 21*i* to a temperature lower than the melting point or softening point of the metal powder and then introduced into a chamber 23*a* in the cold spray gun 23. The chamber 23*a* is installed with a pressure gauge 23*b* and a thermometer 23*c*, which are used for feedback control of the pressure and temperature.

On the other hand, the metal powder supply unit 22 includes a metal powder supply device 22*a*, which is provided with a weighing machine 22*b* and a metal powder supply line 22*c*. The carrier gas from the compressed gas cylinder 21*a* is introduced into the metal powder supply device 22*a* through the carrier gas line 21*c*. A predetermined amount of the metal powder weighed by the weighing machine 22*b* is carried into the chamber 23*a* via the metal powder supply line 22*c*.

The cold spray gun 23 sprays the metal powder P, which is carried into the chamber 23*a* by the carrier gas, together with the operation gas as the supersonic flow from the tip of a nozzle 23*d* and causes the metal powder P in the solid phase state or solid-liquid coexisting state to collide with a base material 24 to form a film 24*a*. In one or more embodiments of the present invention, the cylinder head 12 is applied as the base material 24, and the metal powder P is sprayed onto the annular edge portions of the opening portions 16*a* and 17*a* of the cylinder head 12 using the cold spray method to form the valve seat films 16*b* and 17*b*.

The valve seats of the cylinder head 12 are required to have high heat resistance and wear resistance to withstand the impact input from the valves in the combustion chambers 15 and high thermal conductivity for cooling the combustion chambers 15. In response to these requirements, according to the valve seat films 16*b* and 17*b* formed of the powder of precipitation-hardened copper alloy, for example, the valve seats can be obtained which are excellent in the heat resistance and wear resistance and harder than the cylinder head 12 formed of an aluminum alloy for casting.

Moreover, the valve seat films 16*b* and 17*b* are formed directly on the cylinder head 12, and higher thermal conductivity can therefore be obtained as compared with conventional valve seats formed by press-fitting seat rings as separate components into the port opening portions. Furthermore, as compared with the case in which the seat rings as separate components are used, subsidiary effects can be obtained such as that the valve seats can be made close to a water jacket for cooling and the tumble flow can be promoted due to expansion of the throat diameter of the intake ports 16 and exhaust ports 17 and optimization of the port shape.

The metal powder used for forming the valve seat films 16*b* and 17*b* is preferably a powder of metal that is harder than an aluminum alloy for casting and with which the heat resistance, wear resistance, and thermal conductivity required for the valve seats can be obtained. For example, it is preferred to use the above-described precipitation-hardened copper alloy. The precipitation-hardened copper alloy for use may be a Corson alloy that contains nickel and silicon, chromium copper that contains chromium, zirconium copper that contains zirconium, or the like. It is also possible to apply, for example, a precipitation-hardened copper alloy that contains nickel, silicon, and chromium, a precipitation-hardened copper alloy that contains nickel, silicon, and zirconium, a precipitation-hardened copper alloy that contains nickel, silicon, chromium, and zirconium, a precipitation-hardened copper alloy that contains chromium and zirconium, or the like.

The valve seat films 16*b* and 17*b* may also be formed by mixing a plurality of types of metal powders, for example, a first metal powder and a second metal powder. In this case, it is preferred to use, as the first metal powder, a powder of metal that is harder than an aluminum alloy for casting and with which the heat resistance, wear resistance, and heat conductivity required for valve seats can be obtained. For example, it is preferred to use the above-described precipitation-hardened copper alloy. On the other hand, it is preferred to use, as the second metal powder, a powder of metal that is harder than the first metal powder. The second metal powder for application may be an alloy such as an iron-based alloy, a cobalt-based alloy, a chromium-based alloy, a nickel-based alloy, or a molybdenum-based alloy, ceramics, or the like. One type of these metals may be used alone, or two or more types may also be used in combination.

With the valve seat films formed of a mixture of the first metal powder and the second metal powder which is harder than the first metal powder, more excellent heat resistance and wear resistance can be obtained than those of valve seat films formed only of a precipitation-hardened copper alloy. The reason that such an effect is obtained appears to be because the second metal powder allows the oxide film existing on the surface of the cylinder head 12 to be removed so that a new interface is exposed and formed to improve the interfacial adhesion between the cylinder head 12 and the metal films. Additionally or alternatively, it appears that the anchor effect due to the second metal powder sinking into the cylinder head 12 improves the interfacial adhesion between the cylinder head 12 and the metal films. Additionally or alternatively, it appears that when the first metal powder collides with the second metal powder, a part of the kinetic energy is converted into heat energy, or heat is generated in the process in which a part of the first metal powder is plastically deformed, and such heat promotes the precipitation hardening in a part of the precipitation-hardened copper alloy used as the first metal powder.

First Embodiment

Figure 4:
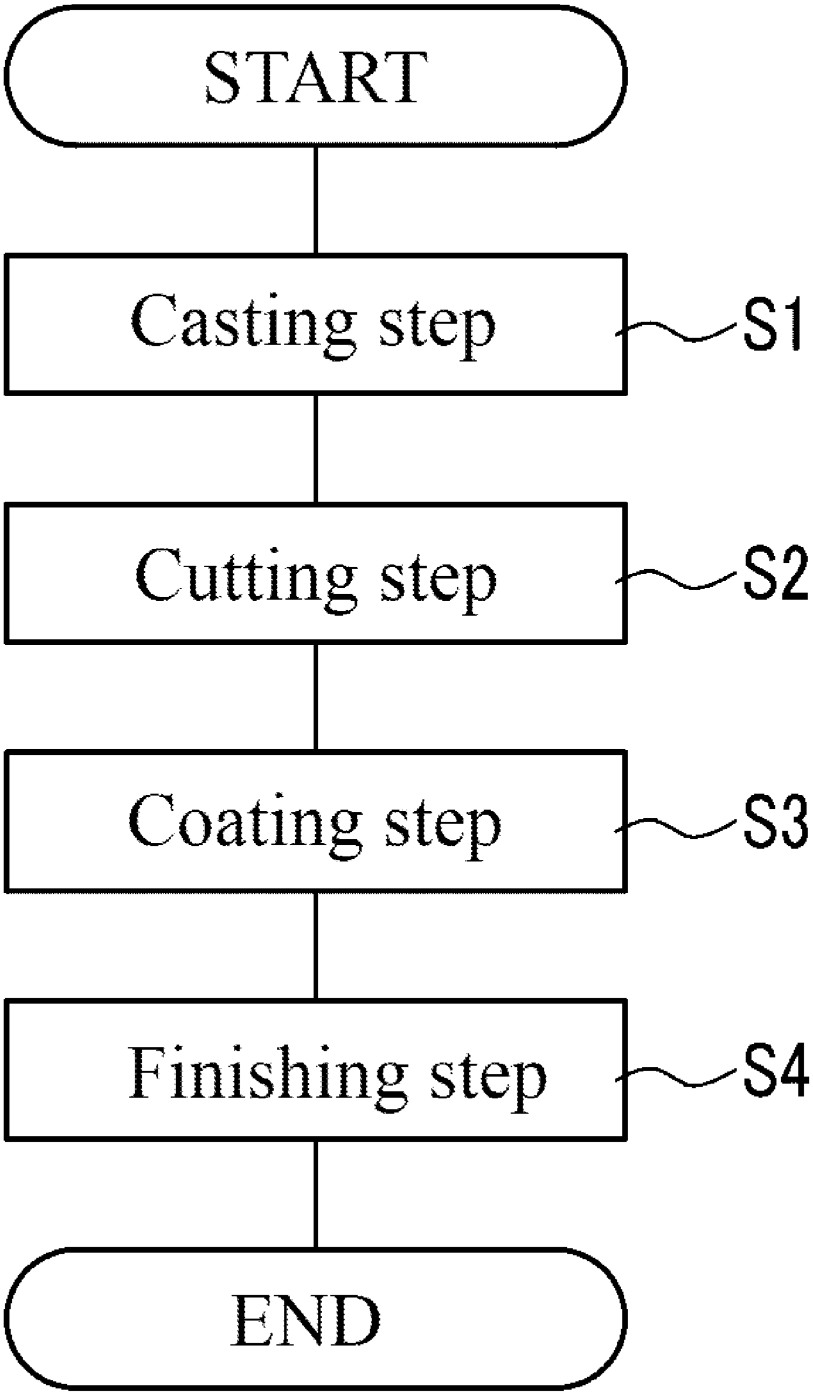
FIG. 4 is a process chart of the method for manufacturing a cylinder head according to a first embodiment of the present invention.

A method for manufacturing the cylinder head 12 including the valve seat films 16*b* and 17*b* will then be described. FIG. 4 is a process chart illustrating the method for manufacturing the cylinder head 12 of the present embodiment. As illustrated in this figure, the method for manufacturing the cylinder head 12 of the present embodiment includes a casting step (step S1), a cutting step (step S2), a coating step (step S3), and a finishing step (step S4).

In the casting step S1, an aluminum alloy for casting is poured into a mold in which sand cores are set, and a semimanufactured cylinder head having intake ports 16 and exhaust ports 17 formed in the main body is cast-molded. The intake ports 16 and the exhaust ports 17 are formed by the sand cores, and the recesses 12*b* are formed by the mold.

Figure 5:
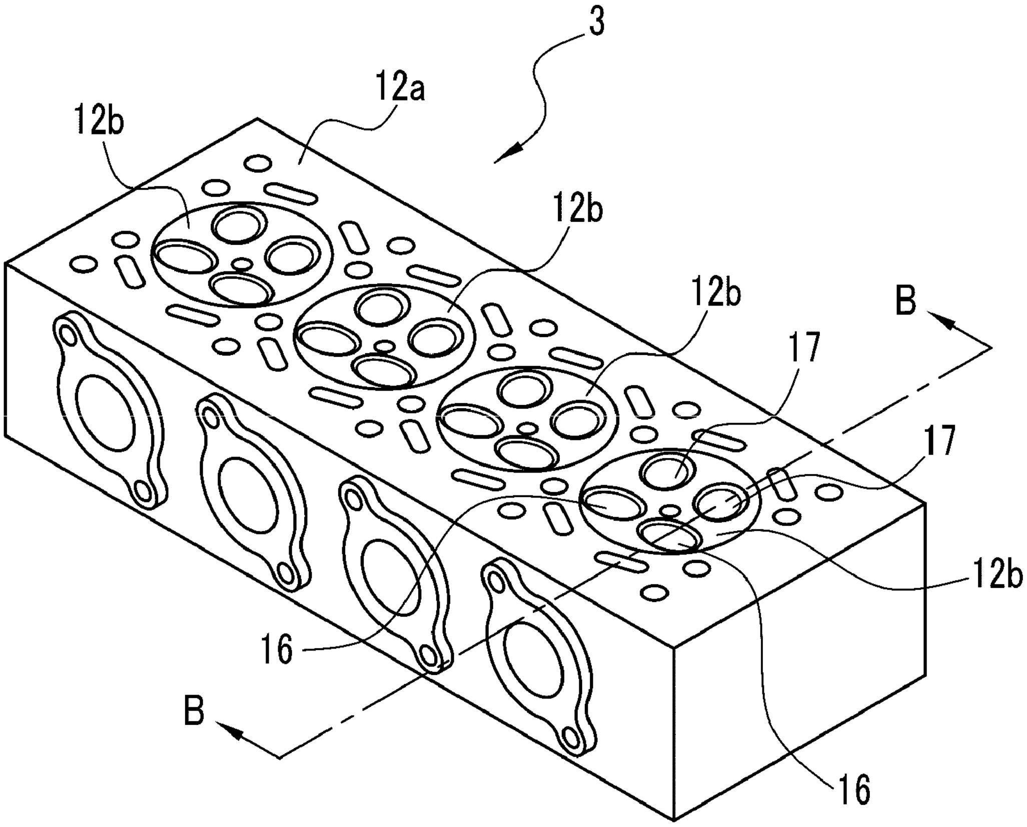
FIG. 5 is a perspective view illustrating the configuration of a semimanufactured cylinder head according to the first embodiment of the present invention.

FIG. 5 is a perspective view of a semimanufactured cylinder head 3 having been cast-molded in the casting step S1 as seen from above the mounting surface 12*a* which is to be mounted to the cylinder block 11. The semimanufactured cylinder head 3 includes four recesses 12*b*, two intake ports 16 and two exhaust ports 17 provided in each recess 12*b*, etc. The two intake ports 16 and two exhaust ports 17 of each recess 12*b* are merged into respective ones in the semimanufactured cylinder head 3, which communicate with openings provided on both side surfaces of the semimanufactured cylinder head 3.

Figure 6A:
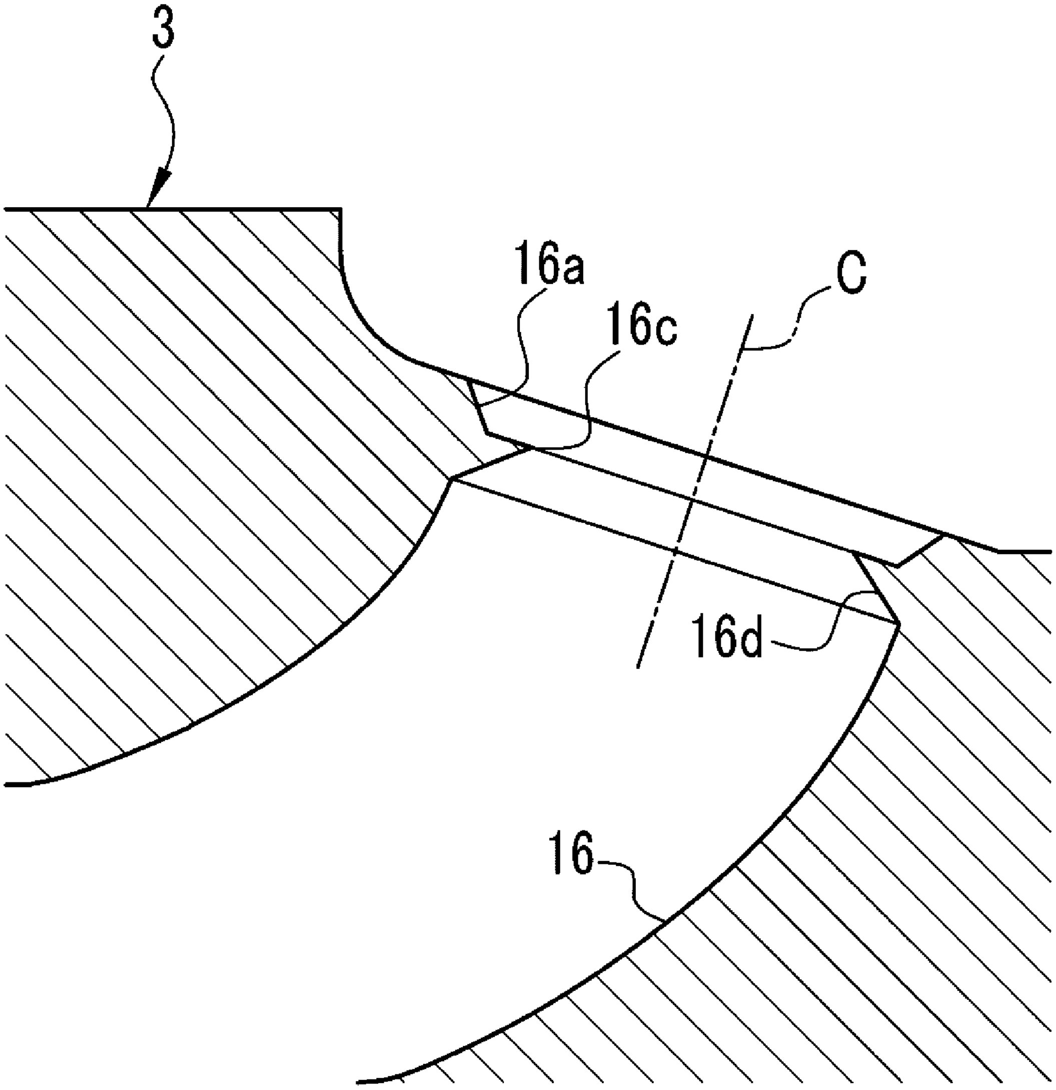
FIG. 6A is a cross-sectional view illustrating the small-diameter portion of an intake port taken along line B-B of FIG. 5.
Figure 6B:
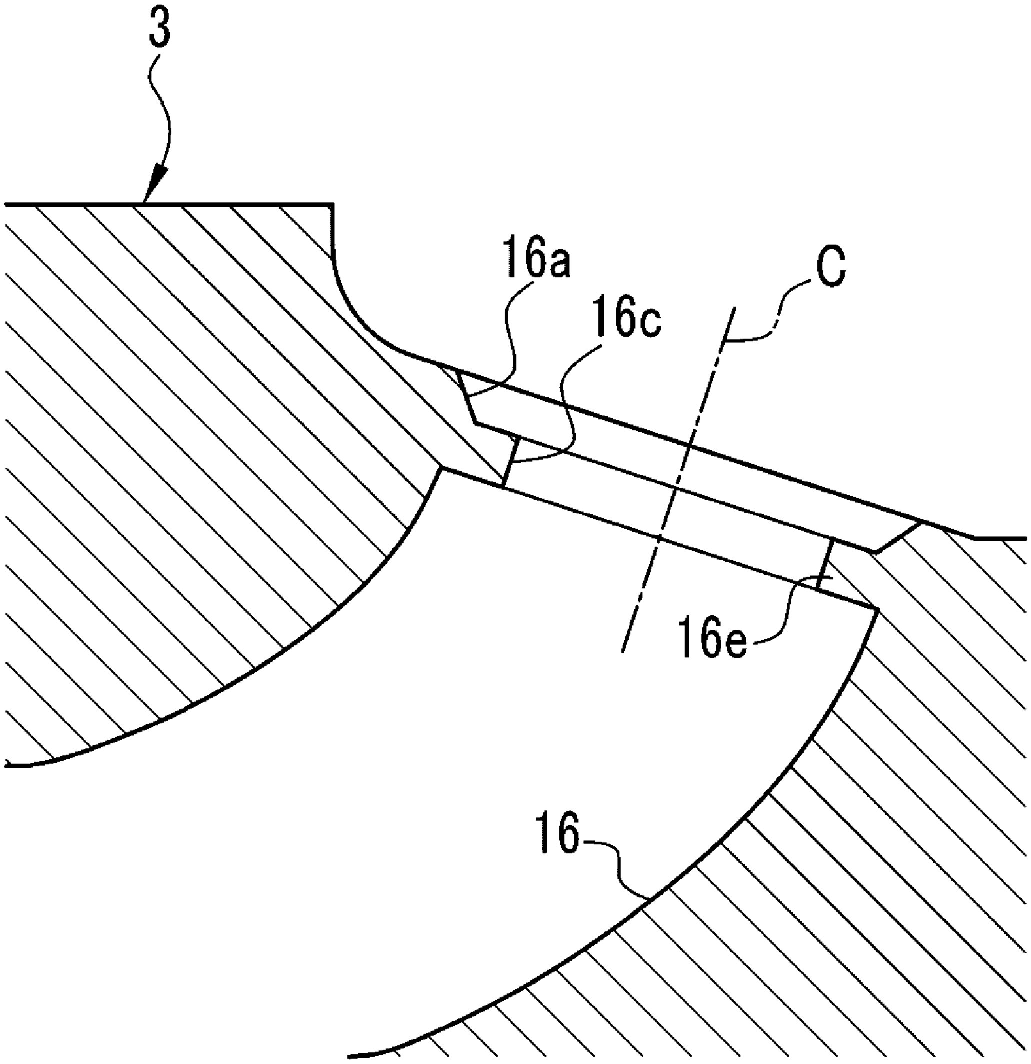
FIG. 6B is a cross-sectional view illustrating the small-diameter portion of another example of the intake port taken along line B-B of FIG. 5.

FIG. 6A is a cross-sectional view of the semimanufactured cylinder head 3 taken along line B-B of FIG. 5 and illustrates an intake port 16. The intake port 16 has the opening portion 16*a* on the combustion chamber 15 side. The opening portion 16*a* is formed with a small-diameter portion 16*c* having a diameter smaller than those of other portions of the intake port 16. The small-diameter portion 16*c* is formed concentrically with the opening portion 16*a* by a sand core. The small-diameter portion 16*c* serves as the base of a shielding curtain portion 16*g* that is to be formed in the subsequent cutting step S2 (see FIGS. 7A and 7B). The small-diameter portion 16*c* may be formed such that the diameter gradually varies from the intake port 16 by a tapered surface 16*d*, or may also be connected to the intake port 16 via a step portion 16*e* as illustrated in FIG. 6B. When considering damage due to stress concentration on the sand core, it is preferred to connect the intake port 16 and the small-diameter portion 16*c* with the tapered surface 16*d*.

Figure 7A:
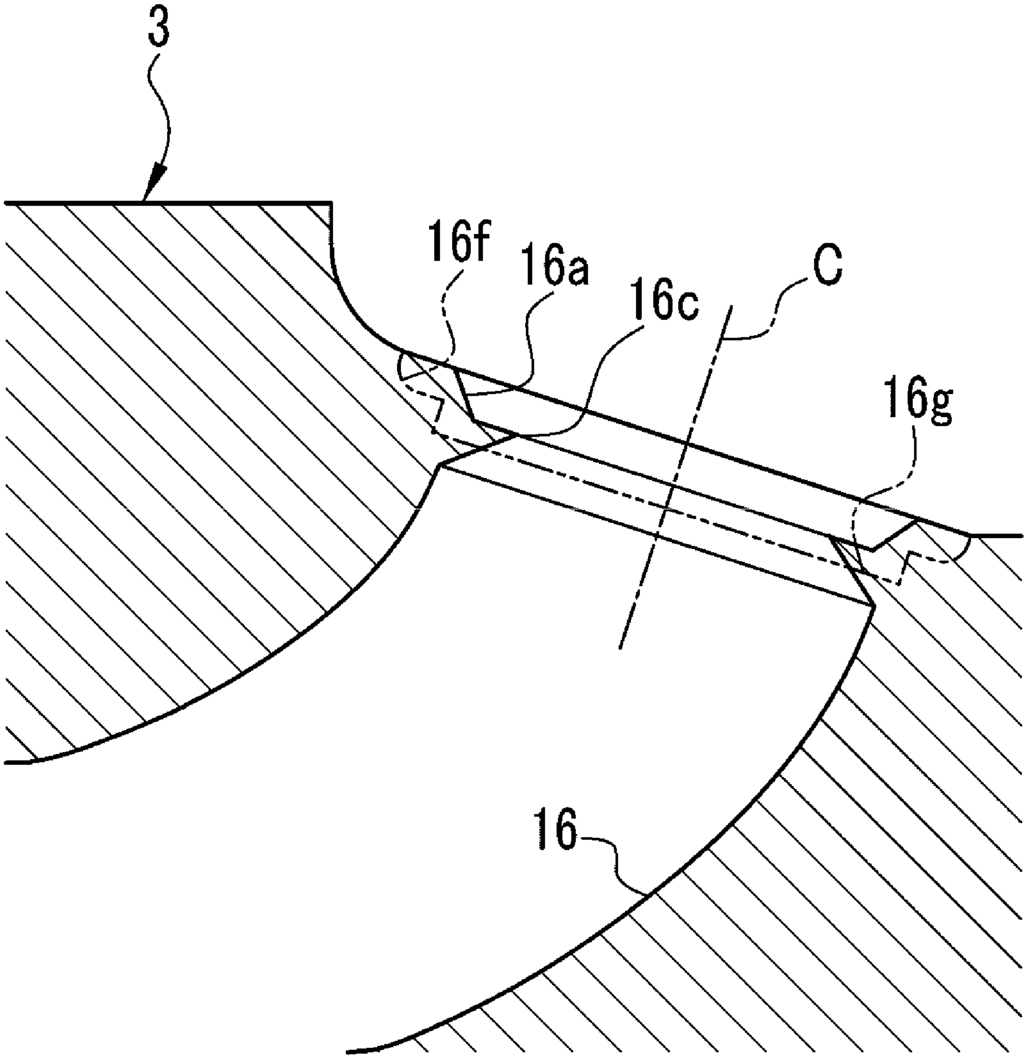
FIG. 7A is a cross-sectional view illustrating, with a dashed-two dotted line, an annular valve seat portion and a shielding curtain portion that are to be formed in the intake port of FIG. 6A.
Figure 7B:
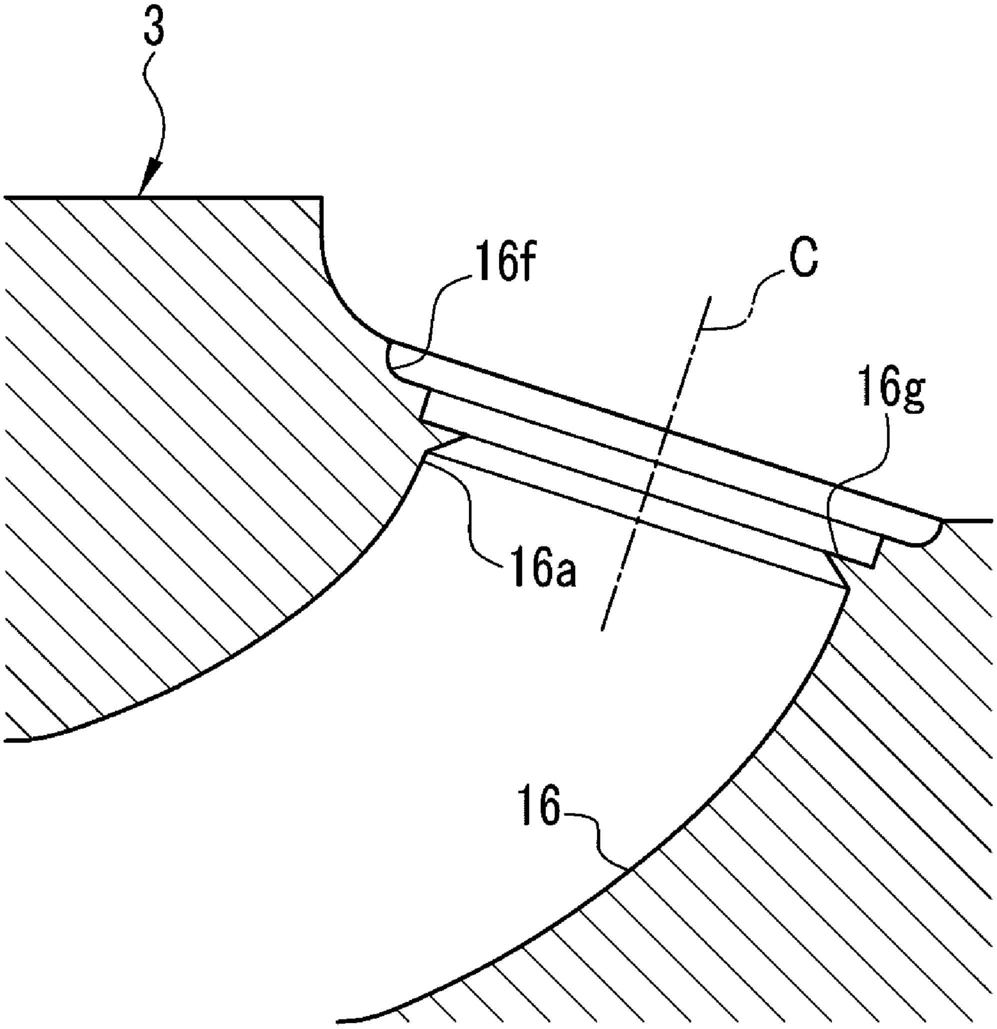
FIG. 7B is a cross-sectional view illustrating the intake port of FIG. 6A formed with the annular valve seat portion and the shielding curtain portion.

In the cutting step S2, milling work is performed on the semimanufactured cylinder head 3, such as using an end mill or a ball end mill, to form an annular valve seat portion 16*f* and the above-described shielding curtain portion 16*g*. FIG. 7A illustrates, with a dashed-two dotted line, the annular valve seat portion 16*f* and the shielding curtain portion 16*g* which are to be formed in the intake port 16 in the cutting step after the casting step illustrated in FIG. 6A. FIG. 7B illustrates a cross-sectional view of the intake port 16 after the annular valve seat portion 16*f* and the shielding curtain portion 16*g* are formed.

The annular valve seat portion 16*f* is an annular groove that serves as the base shape of a valve seat film 16*b*, and is formed on the outer circumference of the opening portion 16*a*. That is, in the method for manufacturing the cylinder head 12 of the present embodiment, metal powder is sprayed onto the annular valve seat portion 16*f* using the cold spray method to form a metal film, and the valve seat film 16*b* is formed based on the metal film. The annular valve seat portion 16*f* is therefore formed with a size slightly larger than the valve seat film 16*b*.

The shielding curtain portion 16*g* is an eave-shaped member that projects in an annular shape from the annular edge portion of the opening portion 16*a* toward the central axis C of the intake port 16, and is located on the inner side of the intake port 16 than the annular valve seat portion 16*f*. The surface of the shielding curtain portion 16*g* on the opening portion 16*a* side is a flat surface orthogonal to the central axis C of the intake port 16. The shielding curtain portion 16*g* is formed by performing the cutting work on the above-described small-diameter portion 16*c* when forming the annular valve seat portion 16*f*. The shielding curtain portion 16*g* is provided to suppress the formation of an excess film on the inner circumferential surface of the intake port 16 when the valve seat film 16*b* is formed in the subsequent coating step S3.

In the coating step S3, metal powder is sprayed onto the annular valve seat portion 16*f* of the semimanufactured cylinder head 3 using the cold spray apparatus 2 to form the valve seat film 16*b*. More specifically, in the coating step S3, the semimanufactured cylinder head 3 and the nozzle 23*d* are relatively moved at a constant speed so that the metal powder is sprayed onto the entire circumference of the annular valve seat portion 16*f* while keeping constant the posture of the annular valve seat portion 16*f* and the nozzle 23*d* of the cold spray gun 23 and the distance between the annular valve seat portion 16*f* and the nozzle 23*d*.

Figure 8:
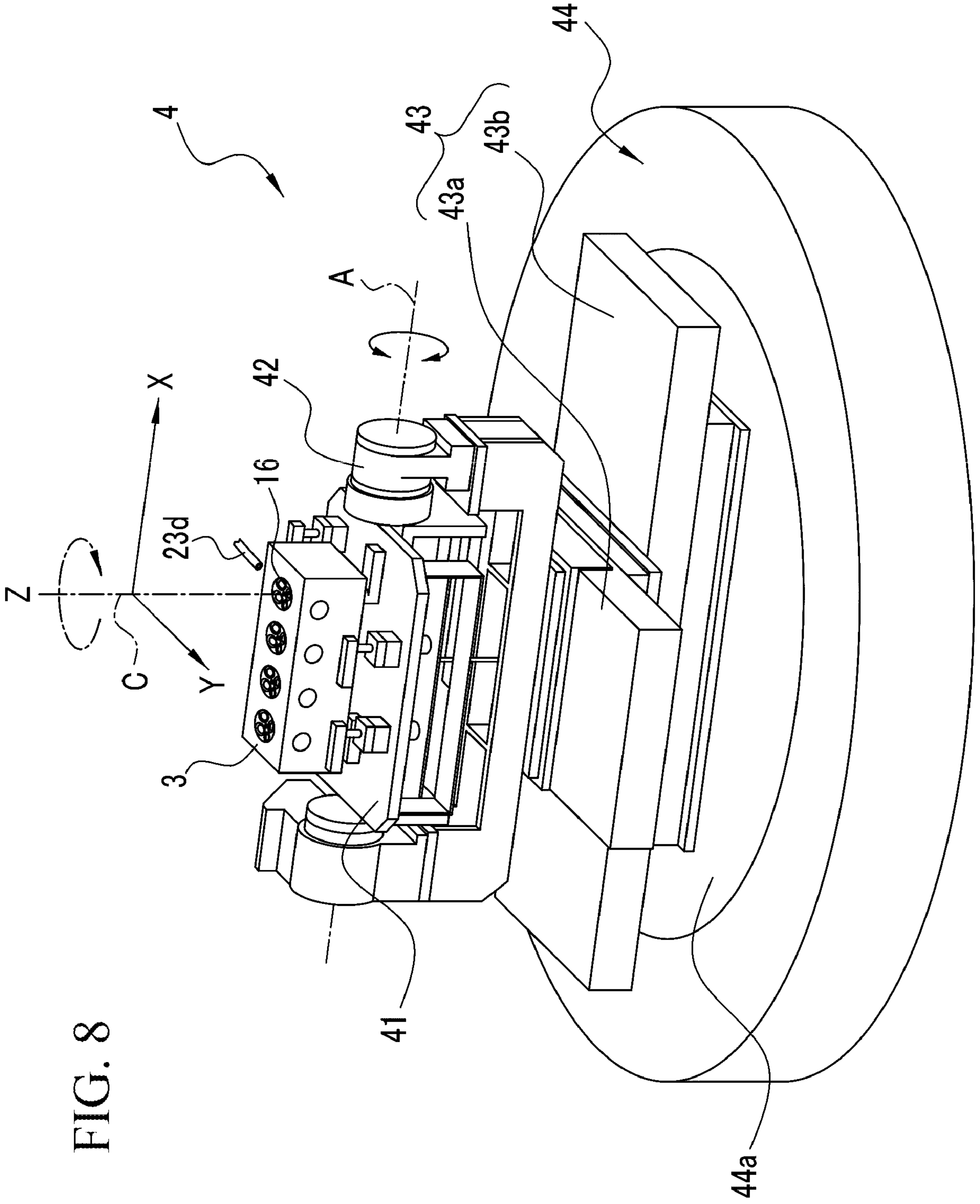
FIG. 8 is a perspective view illustrating the configuration of a work rotating apparatus used for moving the semimanufactured cylinder head in a coating step of FIG. 4.

In this embodiment, for example, the semimanufactured cylinder head 3 is moved with respect to the nozzle 23*d* of the cold spray gun 23, which is fixedly arranged, using a work rotating apparatus 4 illustrated in FIG. 8. The work rotating apparatus 4 includes a work table 41, a tilt stage unit 42, an XY stage unit 43, and a rotation stage unit 44. The work table 41 holds the semimanufactured cylinder head 3.

The tilt stage unit 42 is a stage that supports the work table 41 and rotates the work table 41 around an A-axis arranged in the horizontal direction to tilt the semimanufactured cylinder head 3. The XY stage unit 43 includes a Y-axis stage 43*a* that supports the tilt stage unit 42 and an X-axis stage 43*b* that supports the Y-axis stage 43*a*. The Y-axis stage 43*a* moves the tilt stage unit 42 along the Y-axis arranged in the horizontal direction. The X-axis stage 43*b* moves the Y-axis stage 43*a* along the X-axis orthogonal to the Y-axis on the horizontal plane. This allows the XY stage unit 43 to move the semimanufactured cylinder head 3 to an arbitrary position along the X-axis and the Y-axis. The rotation stage unit 44 has a rotation table 44*a* that supports the XY stage unit 43 on the upper surface, and rotates the rotation table 44*a* thereby to rotate the semimanufactured cylinder head 3 around the Z-axis in an approximately vertical direction.

Figure 9:
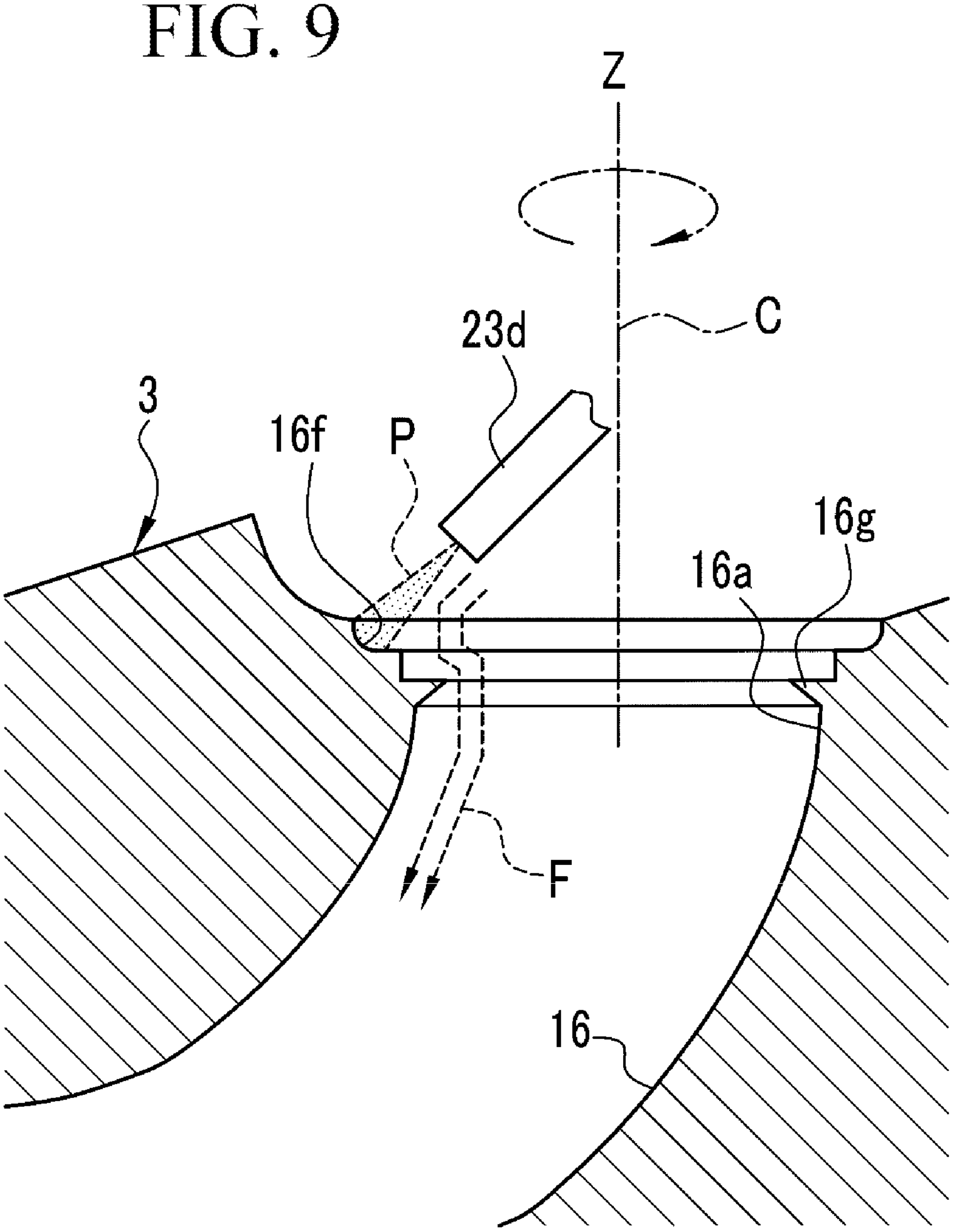
FIG. 9 is a cross-sectional view illustrating a state in which a valve seat film is formed in the intake port of FIG. 7B using a cold spray method.

The tip of the nozzle 23*d* of the cold spray gun 23 is fixedly arranged above the tilt stage unit 42 and in the vicinity of the Z-axis of the rotation stage unit 44. The work rotating apparatus 4 uses the tilt stage unit 42 to tilt the work table 41 so that, as illustrated in FIG. 9, the central axis C of the intake port 16 to be formed with the valve seat film 16*b* becomes vertical. The work rotating apparatus 4 also uses the XY stage unit 43 to move the semimanufactured cylinder head 3 so that the central axis C of the intake port 16 to be formed with the valve seat film 16*b* coincides with the Z-axis of the rotation stage unit 44. In this state, the rotation stage unit 44 rotates the semimanufactured cylinder head 3 around the Z-axis while the nozzle 23*d* of the cold spray gun 23 sprays the metal powder P onto the annular valve seat portion 16*f*, thereby forming a metal film on the entire circumference of the annular valve seat portion 16*f*.

Figure 11A:
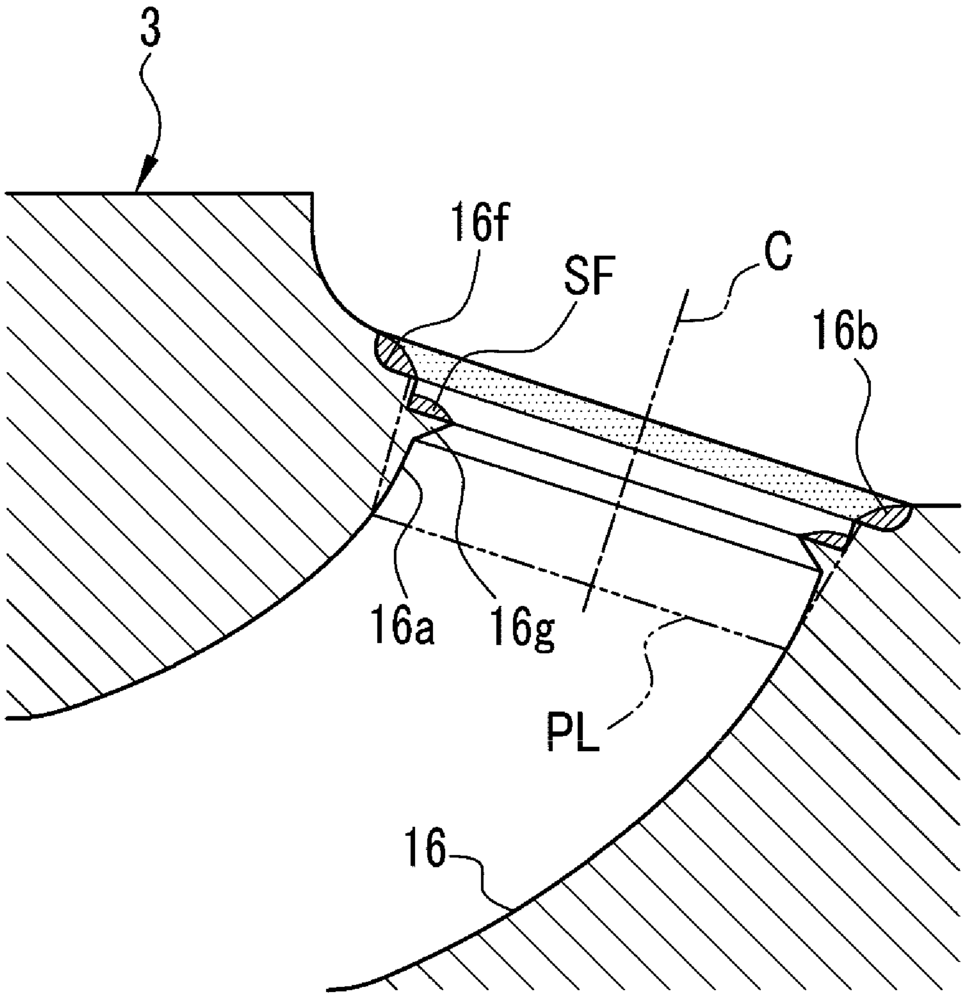
FIG. 11A is a cross-sectional view illustrating a range of finishing work performed on the intake port in which the valve seat film is formed using the cold spray method.

FIG. 11A illustrates a cross-sectional view of the intake port 16 after completing the coating step S3. The shielding curtain portion 16*g* partially shields the intake port 16 and thereby allows the scattered metal powder P to attach to the shielding curtain portion 16*g*, thus suppressing the formation of an excess film in the intake port 16. More specifically, the shielding curtain portion 16*g* shields the inner circumferential surface of the intake port 16 on the opening portion 16*a* side and purposefully allows the metal powder P, which is scattered to other than the annular valve seat portion 16*f*, to attach to the upper surface of the shielding curtain portion 16*g* as an excess film SF, thereby suppressing the formation of an excess film on the inner circumferential surface of the intake port 16 on the opening portion 16*a* side. The metal powder P scattered to other than the annular valve seat portion 16*f* flows over the shielding curtain portion 16*g* into the intake port 16 as indicated by broken arrows F, but during that time, the metal powder P loses the energy for plastic deformation because the flow velocity decreases, and therefore no excess film is formed on the inner side of the intake port 16. Thus, only by the shielding curtain portion 16*g* shielding the inner circumferential surface of the intake port 16 on the opening portion 16*a* side, it is possible to effectively suppress the formation of an excess film on the entire intake port 16.

Moreover, the shielding curtain portion 16*g* has a hole communicating with the intake port 16 at the central part, rather than shielding the entire surface of the intake port 16, and therefore allows the sprayed metal powder P to escape into the intake port 16. According to this structure, the flow velocity of the metal powder P sprayed onto the annular valve seat portion 16*f* does not decrease, and the valve seat film 16*b* can therefore be formed reliably.

Figure 10:
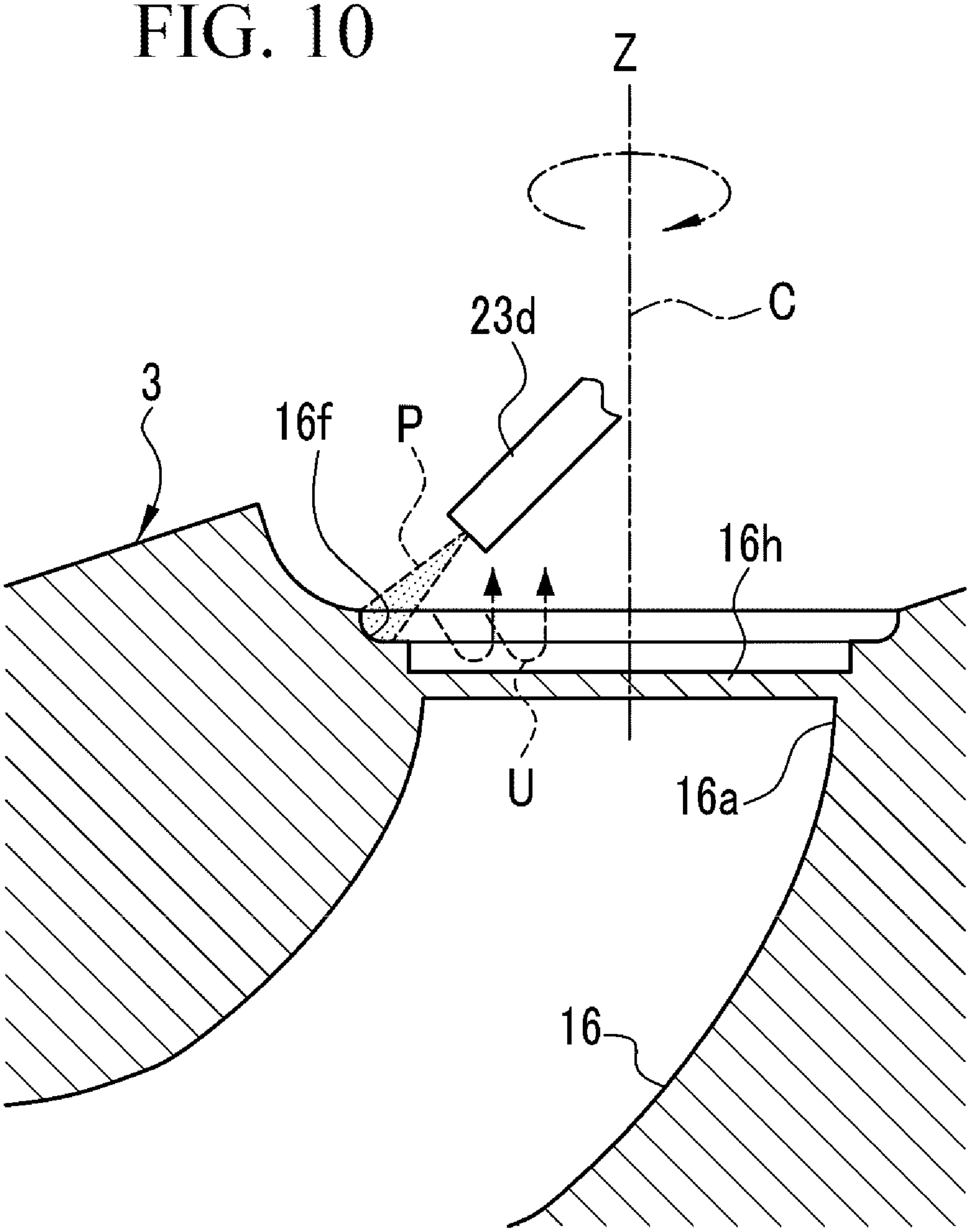
FIG. 10 is a cross-sectional view illustrating a state in which a valve seat film is formed using a cold spray method with a shielding curtain portion (comparative example) that closes the entire opening portion of an intake port.

As illustrated in a comparative example of FIG. 10, for example, if a shielding curtain portion 16*h* is provided so as to cover the entire surface of the intake port 16, a part of the metal powder P injected at the supersonic velocity will bounce back from the shielding curtain portion 16*h* to generate a rising air flow U. This rising air flow U acts in a direction to reduce the flow velocity of the metal powder P when sprayed, so that the particle bond of the metal powder P is weakened to reduce the strength of the valve seat film 16*b*. In this context, according to the shielding curtain portion 16*g* of the present embodiment, such a problem does not occur because the flow of the metal powder P is allowed to escape into the intake port 16 without being excessively obstructed.

The work rotating apparatus 4 temporarily stops the rotation of the rotation stage unit 44 when the semimanufactured cylinder head 3 makes one rotation around the Z-axis to complete the formation of the valve seat film 16*b*. While the rotation is stopped, the XY stage unit 43 moves the semimanufactured cylinder head 3 so that the central axis C of the intake port 16 to be subsequently formed with the valve seat film 16*b* coincides with the Z-axis of the rotation stage unit 44. After the XY stage unit 43 completes the movement of the semimanufactured cylinder head 3, the work rotating apparatus 4 restarts the rotation of the rotation stage unit 44 to form the valve seat film 16*b* for the next intake port 16. This operation is then repeated thereby to form the valve seat films 16*b* and 17*b* for all the intake ports 16 and the exhaust ports 17 of the semimanufactured cylinder head 3. When the valve seat film formation target is switched between an intake port 16 and an exhaust port 17, the tilt stage unit 42 changes the tilt of the semimanufactured cylinder head 3.

In the finishing step S4, finishing work is performed on the valve seat films 16*b* and 17*b*, the intake ports 16, and the exhaust ports 17. In the finishing work performed on the valve seat films 16*b* and 17*b*, the surfaces of the valve seat films 16*b* and 17*b* are cut by milling work using a ball end mill to adjust the valve seat films 16*b* into a predetermined shape.

In the finishing work performed on the intake ports 16, a ball end mill is inserted from the opening portion 16*a* into each intake port 16 to cut the inner circumferential surface of the intake port 16 on the opening port 16*a* side along a working line PL illustrated in FIG. 11A. In this operation, the shielding curtain portion 16*g* and the excess film SF attached to the shielding curtain portion 16*g* are removed.

Figure 11B:
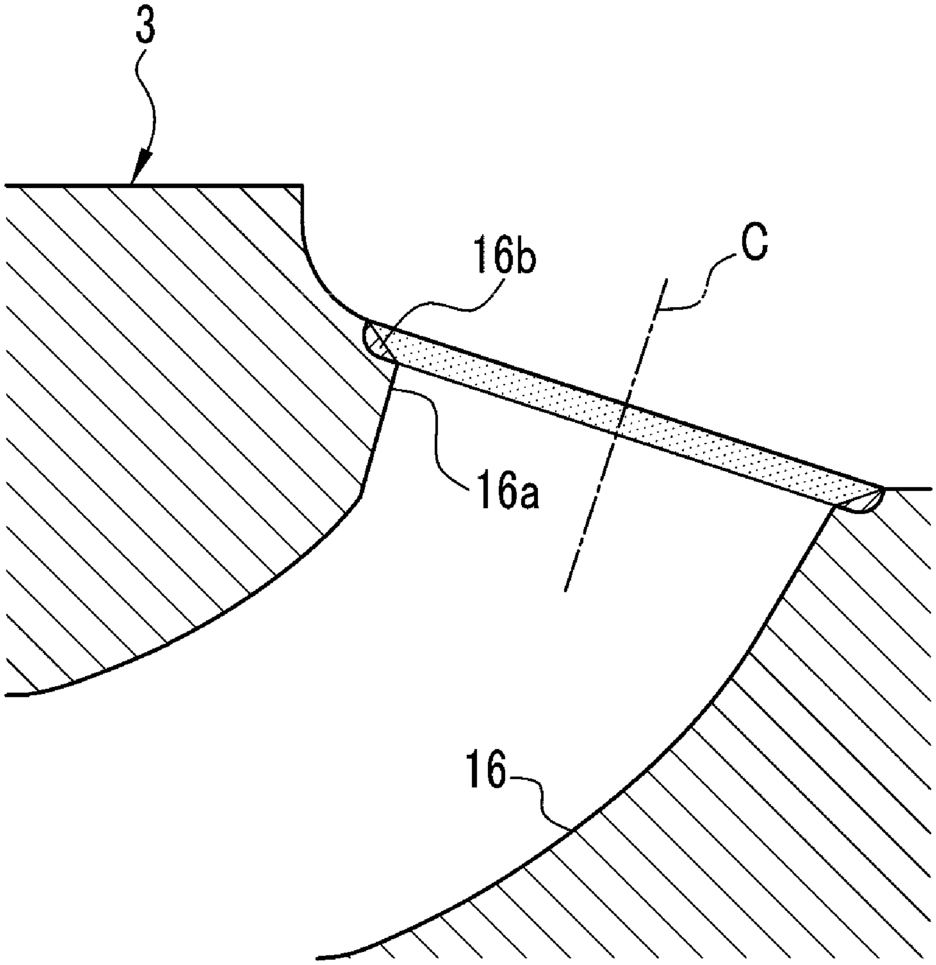
FIG. 11B is a cross-sectional view illustrating a state after the finishing work is performed on the intake port in which the valve seat film is formed using the cold spray method.

Thus, according to the finishing step S4, the surface roughness of the intake port 16 due to the cast molding is eliminated, and the shielding curtain portion 16*g* can be removed. FIG. 11B illustrates an intake port 16 after the finishing step S4.

Like the intake ports 16, each exhaust port 17 is formed with the valve seat film 17*b* through the formation of a small-diameter portion in the exhaust port 17 by the cast molding, the formation of an annular valve seat portion and a shielding curtain portion by the cutting work, the cold spraying onto the annular valve seat portion, and the finishing work. Detailed description will therefore be omitted for the procedure of forming the valve seat films 17*b* on the exhaust ports 17.

As described above, according to the semimanufactured cylinder head 3 and the method for manufacturing the cylinder head 12 of the present embodiment, the valve seat film 16*b* is formed through forming the shielding curtain portion 16*g*, which projects in an annular shape from the annular edge portion of the opening portion 16*a* of the intake port 16 toward the center C of the port, and spraying the metal powder P onto the annular valve seat portion 16*f*, which is located on the outer side of the intake port 16 than the shielding curtain portion 16*g*, using a cold spray method. This allows the shielding curtain portion 16*g* to partially shield the intake port 16 from the metal powder P sprayed onto the annular valve seat portion 16*f*, and the scattered metal powder P can be attached to the shielding curtain portion 16*g*, thus suppressing the formation of an excess film in the intake port 16. Moreover, the shielding curtain portion 16*g* reduces the flow velocity of the metal powder P flowing into the intake port 16, and it is therefore possible to suppress the formation of an excess film on the inner side of the intake port 16. Furthermore, the shielding curtain portion 16*g* allows the metal powder P to escape from the central hole to the intake port 16 and thereby prevents the flow velocity reduction of the metal powder P sprayed onto the annular valve seat portion 16*f*, and the valve seat film 16*b* having high strength can thus be formed.

The shielding curtain portion 16*g* is formed through forming the small-diameter portion 16*c* integrally with the semimanufactured cylinder head 3 in the casting step S1 and performing the cutting work on the small-diameter portion 16*c* in the cutting step S2, but these casting step S1 and cutting step S2 are steps that are also performed in the conventional manufacturing process for the cylinder head 12. In addition, while the shielding curtain portion 16*g* is removed in the finishing step S4 after the formation of the valve seat film 16*b*, this finishing step S4 is also a step that is performed in the conventional manufacturing process for the cylinder head 12. Thus, the number of manufacturing steps for the cylinder head 12 does not increase due to the formation of the shielding curtain portion 16*g*, and the manufacturing cost for the cylinder head 12 does not increase significantly. Furthermore, the shielding curtain portion 16*g* is removed after the formation of the valve seat film 16*b* and therefore does not affect the intake performance of the intake port 16. These effects can be similarly obtained in the formation of the valve seat film 17*b* for the exhaust port 17.

Second Embodiment

A method for manufacturing the cylinder head 12 according to the second embodiment will then be described. This embodiment differs from the first embodiment in the shape of the shielding curtain portion formed from the small-diameter portion 16*c* in the cutting step S2 and the function of the shielding curtain portion in the coating step S3, but the other steps are the same as those in the first embodiment, so the description for those other than the cutting step S2 and the coating step S3 will be omitted by borrowing the description of the first embodiment.

Figure 12A:
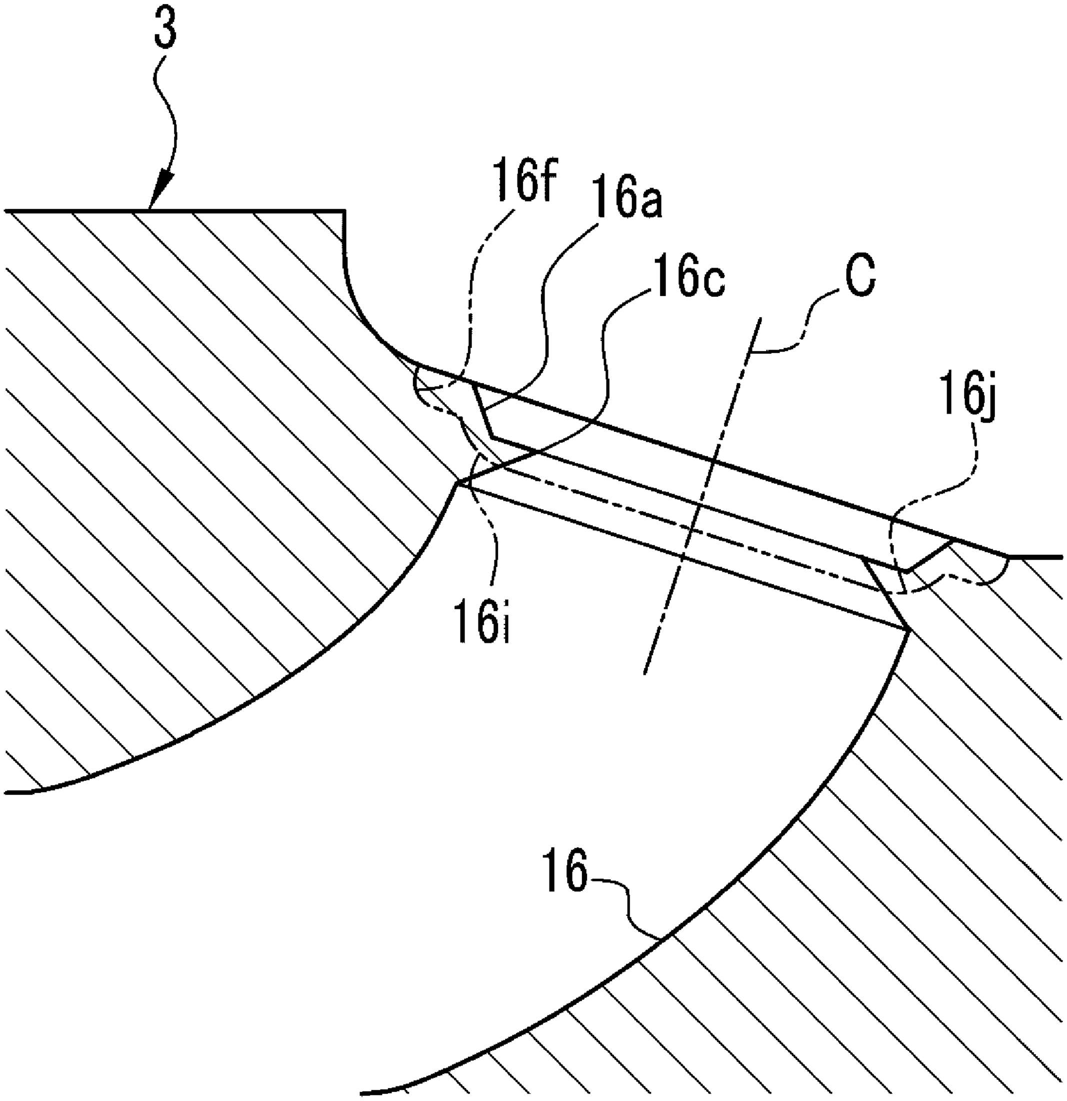
FIG. 12A is a cross-sectional view illustrating, with a dashed-two dotted line, an annular valve seat portion and a shielding curtain portion according to a second embodiment of the present invention that are to be formed in the intake port of FIG. 6A.

FIG. 12A is a cross-sectional view of the intake port 16 portion of the semimanufactured cylinder head 3 and illustrates, with a dashed-two dotted line, the shapes of an annular valve seat portion 16*f* and a shielding curtain portion 16*i* that are to be formed on the semimanufactured cylinder head 3 in the cutting step S2 of this embodiment. The shielding curtain portion 16*i* of this embodiment has an arc-shaped control surface 16*j* on the surface side onto which the metal powder P is sprayed by the cold spray apparatus 2, that is, on the surface of the intake port 16 on the combustion chamber 15 side. The control surface 16*j* controls the flow direction of the metal powder P.

Figure 12B:
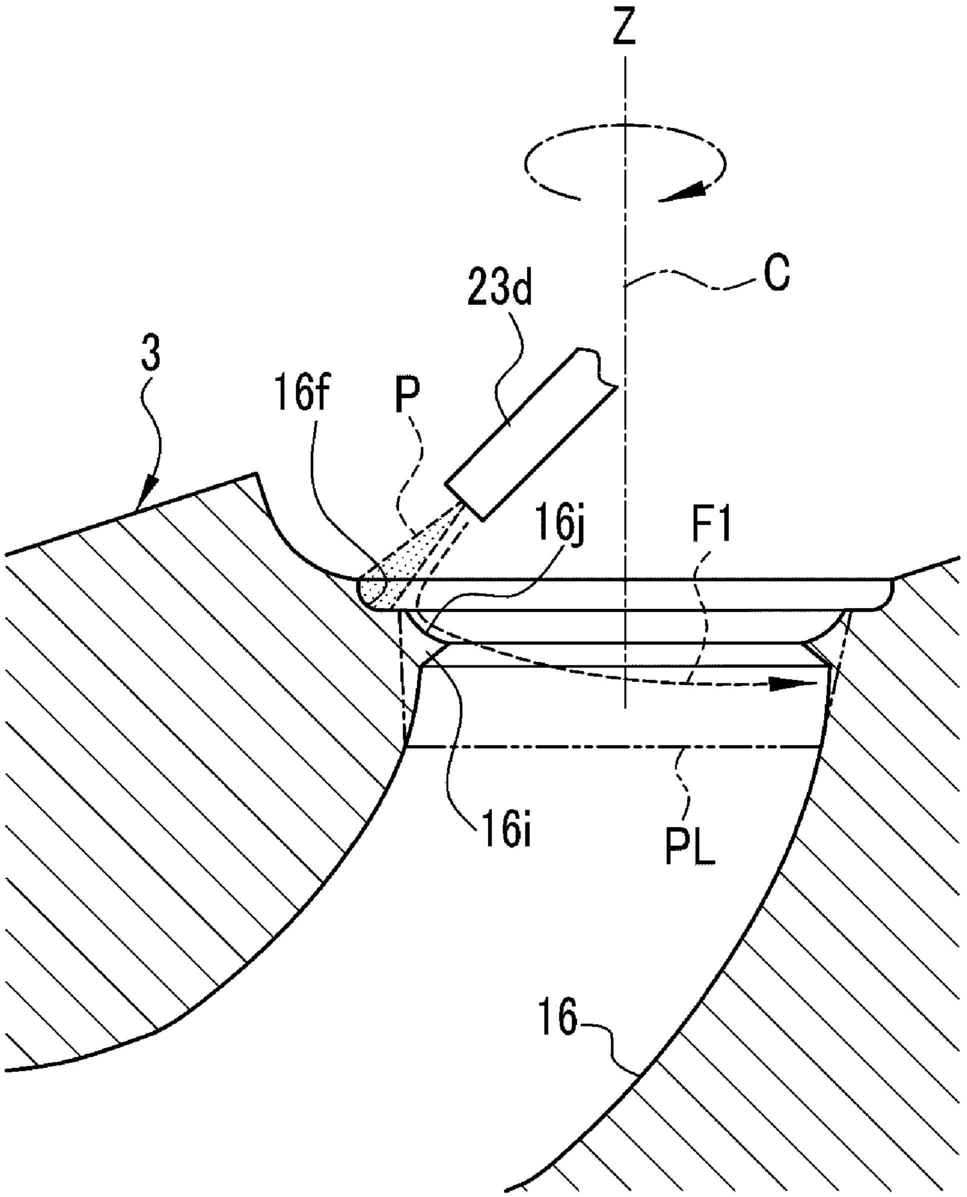
FIG. 12B is a cross-sectional view illustrating a state in which a valve seat film is formed using the cold spray method in the intake port having been formed with the annular valve seat portion and shielding curtain portion of FIG. 12A.
Figure 12C:
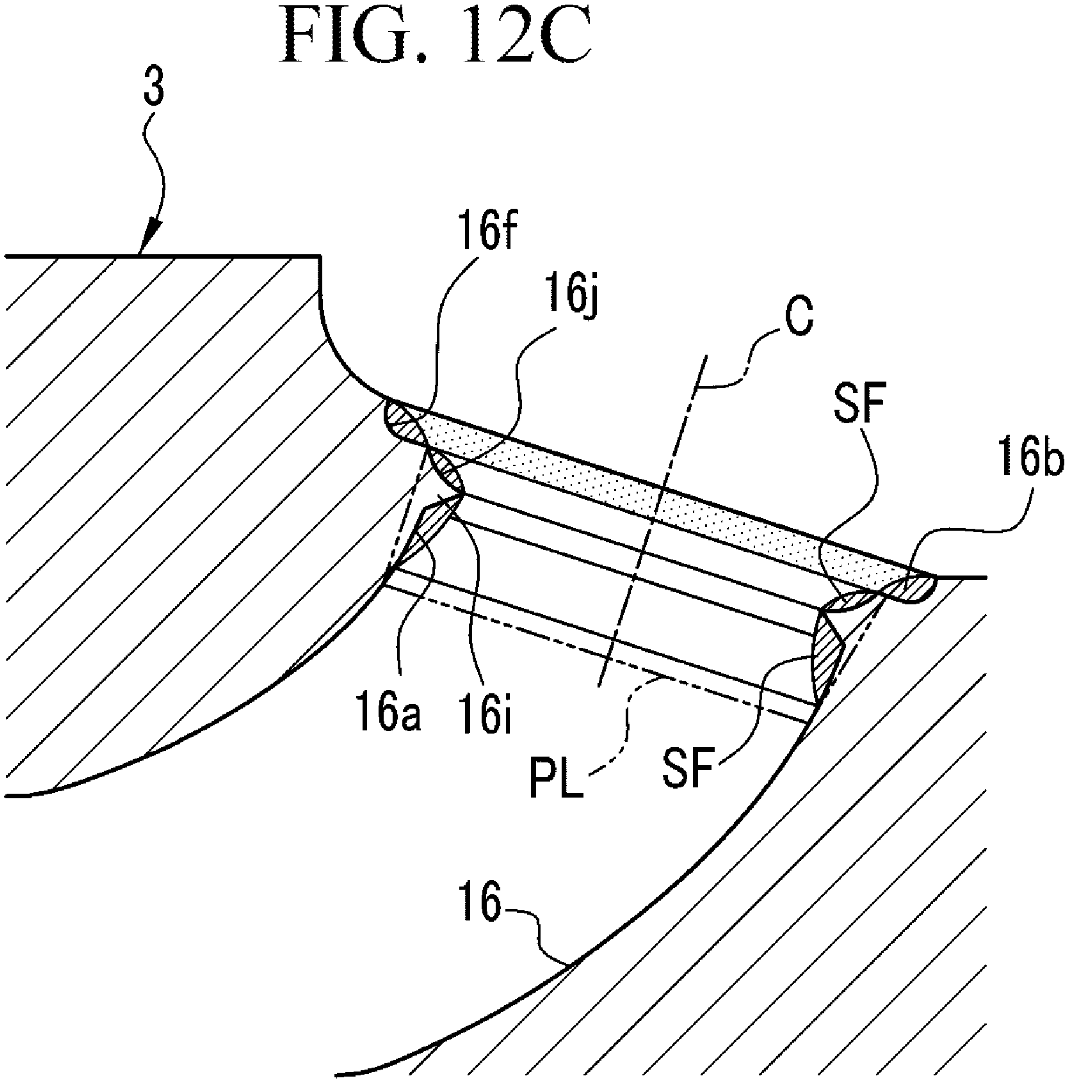
FIG. 12C is a cross-sectional view illustrating a state after the valve seat film is formed using the cold spray method in the intake port having been formed with the annular valve seat portion and shielding curtain portion of FIG. 12A.

FIG. 12B illustrates the coating step for forming the valve seat film 16*b* in the intake port 16 of this embodiment. As indicated by a broken arrow F1, the control surface 16*j* controls the flow direction of the metal powder P so that an excessive film SF is formed by the metal powder P hitting the inner circumferential surface of the intake port 16 to be subjected to the finishing work after the formation of the valve seat film 16*b*, that is, the inner circumferential surface within the working line PL. The inner circumferential surface is located on the opposite side of the position, onto which the metal powder P is sprayed, with respect to the central axis C of the intake port 16. FIG. 12C illustrates a cross-sectional view of the intake port 16 after completing the coating step S3. The scattered metal powder P is attached as the excessive film SF to the control surface 16*j* of the shielding curtain portion 16*i*. From another aspect, the metal powder P whose flow direction is controlled by the control surface 16*j* is attached as the excessive film SF to the inner surface within the working line PL below the shielding curtain portion 16*i*. For the exhaust port 17, the valve seat film 17*b* is formed by the same scheme as that for the intake port 16, so the detailed description will be omitted.

According to the semimanufactured cylinder head 3 and the method for manufacturing the cylinder head 12 of this embodiment, the flow direction of the metal powder P is controlled by the control surface 16*j* of the shielding curtain portion 16*i* so that the metal powder P hits the inner surface on the opposite side within the working line, and the scattered metal powder P can therefore be attached as the excessive film SF within the range of the working line PL. It is thus possible to suppress the formation of an excessive film on the inner side of the intake port 16. Moreover, the shielding curtain portion 16*i* and the excessive film SF in the working line PL do not adversely affect the intake performance of the intake port 16 and the exhaust performance of the exhaust port 17 because the inside of the working line PL is subjected to the finishing work in the finishing step S4.

Third Embodiment

A method for manufacturing the cylinder head 12 according to the third embodiment will then be described. This embodiment includes a casting step, a cutting step, a coating step, and a finishing step as in the first embodiment, but is different from the first embodiment in that a shield plate that is a separate component from the semimanufactured cylinder head is used as the shielding curtain portion. In the third embodiment, the same configurations as those of the first embodiment are denoted by the same reference numerals, and the detailed description will be omitted.

Figure 13A:
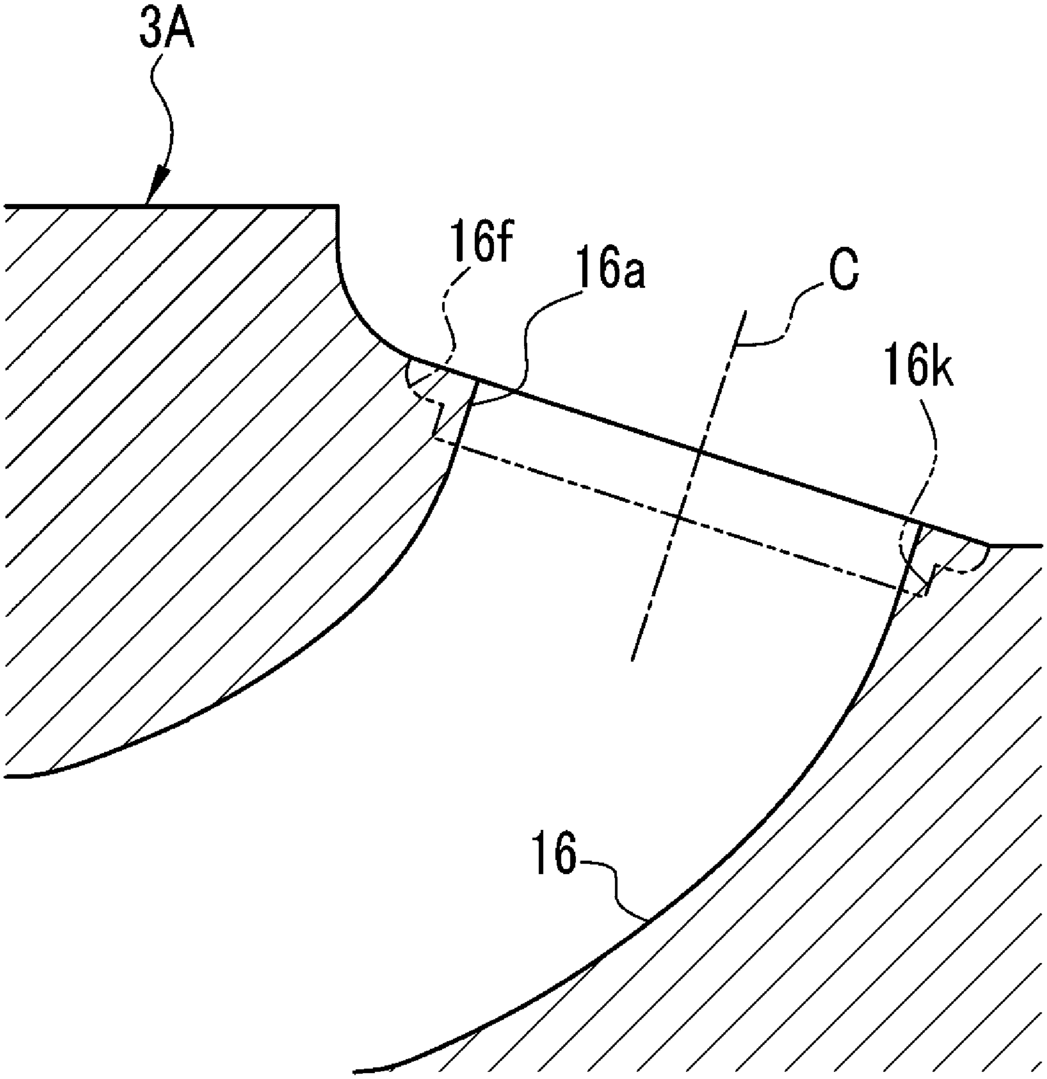
FIG. 13A is a cross-sectional view illustrating, with a dashed-two dotted line, an annular valve seat portion and a shield plate insertion portion that are to be formed on the semimanufactured cylinder head according to a third embodiment of the present invention.

FIG. 13A is a cross-sectional view illustrating the intake port 16 of a semimanufactured cylinder head 3A that is molded in the casting step of this embodiment. The semimanufactured cylinder head 3A is not provided with a small-diameter portion that serves as a base of the shielding curtain portion because the shielding curtain portion is a separate component. The dashed-two dotted line in the figure indicates the shape of the intake port 16 after the cutting work in the cutting step of this embodiment. In the cutting step, the intake port 16 is formed with an annular valve seat portion 16*f* and a shield plate insertion portion 16*k*. The shield plate insertion portion 16*k* is a step portion that is formed inside the annular valve seat portion 16*f* and on the inner side of the intake port 16 than the annular valve seat portion 16*f*.

Figure 13B:
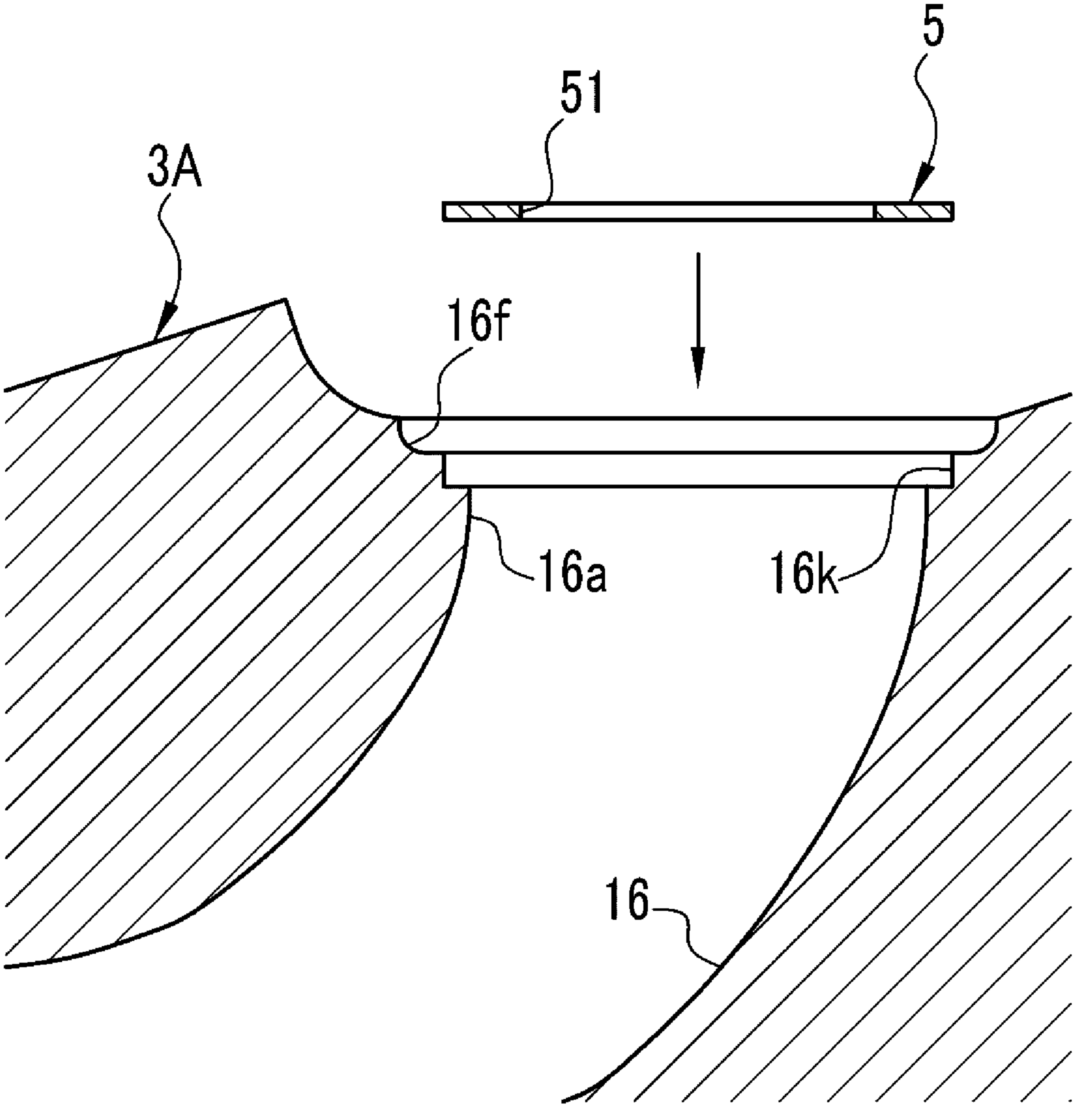
FIG. 13B is a cross-sectional view illustrating a state in which a shield plate is inserted into the intake port formed with the annular valve seat portion and shield plate insertion portion of FIG. 13A.

In the coating step of this embodiment, the semimanufactured cylinder head 3A is set on the work rotating apparatus 4 as in the first embodiment. Then, the semimanufactured cylinder head 3A is moved by the tilt stage unit 42 and the XY stage unit 43 so that the central axis C of the intake port 16 to be formed with the valve seat film 16*b* is vertical and coincides with the Z-axis of the rotation stage unit 44. Subsequently, as illustrated in FIG. 13B, a disk-shaped shield plate 5 provided with an opening 51 in the central part is inserted into the shield plate insertion portion 16*k* of the intake port 16 from above. The shield plate 5 is preferably formed of a material harder than the metal powder P, such as ceramics, in order to suppress the formation of a metal film on the shield plate 5.

Figure 13C:
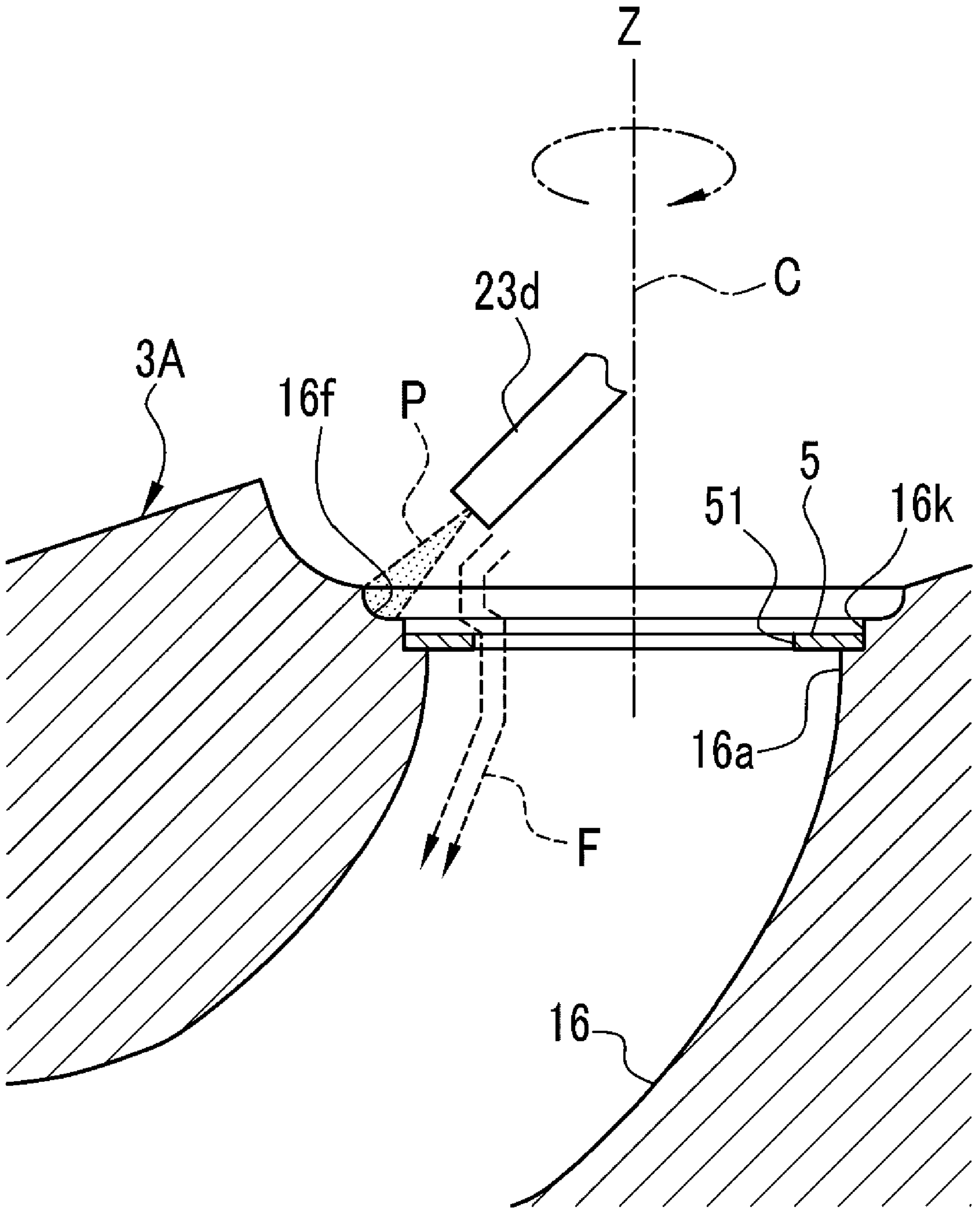
FIG. 13C is a cross-sectional view illustrating a state in which a valve seat film is formed using the cold spray method in the intake port incorporated with the shield plate by insertion.

As illustrated in FIG. 13C, in the coating step, the rotation stage unit 44 rotates the semimanufactured cylinder head 3A around the Z-axis while the nozzle 23*d* of the cold spray gun 23 sprays the metal powder P onto the annular valve seat portion 16*f*, thereby forming a metal film on the entire circumference of the annular valve seat portion 16*f*. Like the shielding curtain portion of the first embodiment, the shield plate 5 allows the scattered metal powder P to attach to the upper surface of the shield plate 5, thereby suppressing the formation of an excess film in the intake port 16.

Figure 13D:
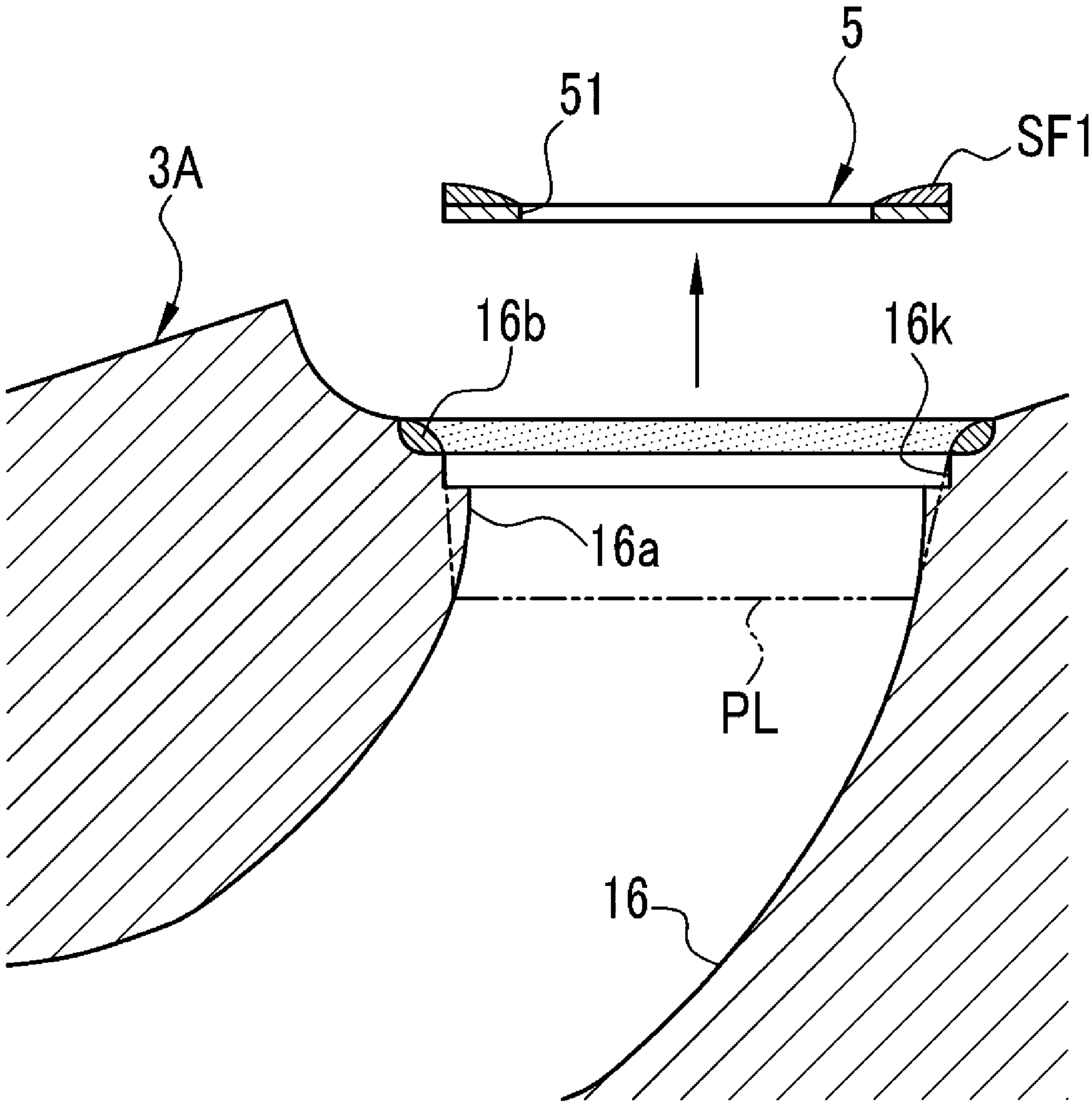
FIG. 13D is a cross-sectional view illustrating a state in which the shield plate is removed from the intake port formed with the valve seat film.

As illustrated in FIG. 13D, the shield plate 5 is removed from the intake port 16 at the timing when the operation of the work rotating apparatus 4 is temporarily stopped after the formation of the valve seat film 16*b*. After that, in the finishing step, the finishing work is performed on the semimanufactured cylinder head 3A, and the inside of the working line PL of the intake port 16 is cut. The range of the working line PL is approximately the same as that of the working line PL of the first embodiment by setting the projection amount of the shield plate 5 from the opening portion 16*a* of the intake port 16 to be approximately the same as that for the shielding curtain portion of the first embodiment. For the exhaust port 17, the valve seat film 17*b* is formed by the same scheme as that for the intake port 16, so the detailed description will be omitted.

The shield plate 5 is formed of a material harder than the metal powder P, but an excessive film SF1 is still formed on the upper surface. It is therefore preferred to replace the shield plate 5 periodically or when the excess film SF1 becomes so thick as to impair the function of the shield plate 5. The insertion and removal of the shield plate 5 with respect to the shield plate insertion portion 16*k* may be performed manually or by an automated machine such as a robot.

According to the method for manufacturing the cylinder head 12 of this embodiment, the use of the shield plate 5 can suppress the formation of an excess film in the intake port 16 and the exhaust port 17 as in the first embodiment without significantly changing the conventional casting step and cutting step for the cylinder head 12. Moreover, the shield plate 5 is provided with the opening 51 to allow the metal powder P to escape to the intake port 16 and it is therefore possible to suppress the flow velocity reduction of the metal powder P sprayed onto the annular valve seat portion 16*f* and form the valve seat film 16*b* having sufficient strength.

In each of the above-described embodiments, the semimanufactured cylinder head 3 is formed with the small-diameter portion 16*c* in the casting step S1, but when the cylinder head 12 is manufactured after a semimanufactured cylinder head 3 provided with the small-diameter portion 16*c* is supplied from another manufacturer, the casting step S1 can be omitted as a matter of course. In the above-described embodiments, the nozzle 23*d* of the cold spray gun 23 is fixedly arranged and the semimanufactured cylinder head 3 is rotated and moved, but on the contrary, the semimanufactured cylinder head 3 may be fixedly arranged and the nozzle 23*d* may be moved.

DESCRIPTION OF REFERENCE NUMERALS

- 1 Internal-combustion engine
  - 12 Cylinder head
  - 16 Intake port
    - 16*a* Opening portion
    - 16*b* Valve seat film
    - 16*c* Small-diameter portion
    - 16*f* Annular valve seat portion
    - 16*g* Shielding curtain portion
    - 16*h* Shielding curtain portion
    - 16*i* Shielding curtain portion
    - 16*j* Control surface
    - 16*k* Shield plate insertion portion
  - 17 Exhaust port
    - 17*a* Opening portion
    - 17*b* Valve seat film
  - 18 Intake valve
  - 19 Exhaust valve
- 2 Cold spray apparatus
  - 21 Gas supply unit
  - 22 Metal powder supply unit
  - 23 Cold spray gun
    - 23*d* Nozzle
- 3 Semimanufactured cylinder head
- 3A Semimanufactured cylinder head
- 4 Work rotating apparatus
  - 41 Work table
  - 42 Tilt stage unit
  - 43 XY stage unit
  - 44 Rotation stage unit
- 5 Shield plate
  - 51 Opening
- C Central axis of intake port
- P Metal powder
- F Flow path of metal powder
- F1 Flow path of metal powder
- U Rising air flow
- SF Excessive film
- SF1 Excessive film
- PL Working line

The invention claimed is:

1. A method for manufacturing a cylinder head, comprising:

manufacturing a semimanufactured cylinder head comprising a main body, the main body having a port for intake or exhaust and a shielding curtain portion, the port having opening portions, the shielding curtain portion projecting in an annular shape from an annular edge portion of at least one of the opening portions toward a center of the port; and spraying metal powder onto an annular valve seat portion using a cold spray method to form a valve seat film, the annular valve seat portion being located on an outer side of the port than the shielding curtain portion, the shielding curtain portion having a surface on a side of the at least one of the opening portions, the surface being arranged on an inner side of the port than a surface of the annular valve seat portion so as not to be same as the surface of the annular valve seat portion.

2. The method for manufacturing a cylinder head according to claim 1, wherein the shielding curtain portion is integrally cast-molded with the semimanufactured cylinder head and removed after formation of the valve seat film.

3. The method for manufacturing a cylinder head according to claim 2, wherein the shielding curtain portion is removed at same time when finishing work is performed on an inner circumferential surface of the port.

4. The method for manufacturing a cylinder head according to claim 1, wherein, when the semimanufactured cylinder head is manufactured, the at least one of the opening portions is formed with a small-diameter portion having a smaller diameter than other portions of the port, and when cutting work is performed on the annular edge portion of the at least one of the opening portions to form the annular valve seat portion, the cutting work is performed on the small-diameter portion to form the shielding curtain portion.

5. The method for manufacturing a cylinder head according to claim 1, wherein, when the semimanufactured cylinder head is manufactured, an arc-shaped control surface that controls a flow direction of the metal powder is formed on a surface side of the shielding curtain portion onto which the metal powder is sprayed, wherein the control surface controls the flow direction so that the metal powder flows toward an inner circumferential surface of the port to be subjected to finishing work after formation of the valve seat film, wherein the inner circumferential surface is located on an opposite side of a position, onto which the metal powder is sprayed, with respect to a central axis of the port.

6. The method for manufacturing a cylinder head according to claim 1, wherein the shielding curtain portion is a separate component from the semimanufactured cylinder head, is arranged on the at least one of the opening portions before spraying the metal powder, and is removed from the at least one of the opening portions after spraying the metal powder.

* * * * *